(12) United States Patent
Harel et al.

(10) Patent No.: US 10,187,151 B2
(45) Date of Patent: Jan. 22, 2019

(54) DIGITAL-ANALOG INTERFACE MODULES (DAIMS) FOR FLEXIBLY DISTRIBUTING DIGITAL AND/OR ANALOG COMMUNICATIONS SIGNALS IN WIDE-AREA ANALOG DISTRIBUTED ANTENNA SYSTEMS (DASS)

(71) Applicant: Corning Optical Communications Wireless Ltd, Airport City (IL)

(72) Inventors: Dror Harel, Hod Hasharon (IL); Gavriel Mizrahi, Tel Aviv (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/472,909

(22) Filed: Mar. 29, 2017

(65) Prior Publication Data

US 2017/0201322 A1 Jul. 13, 2017

Related U.S. Application Data

(63) Continuation of application No. PCT/IL2015/051219, filed on Dec. 16, 2015.
(Continued)

(51) Int. Cl.
*H04B 10/2575* (2013.01)
*H04B 10/40* (2013.01)
(Continued)

(52) U.S. Cl.
CPC ......... *H04B 10/25753* (2013.01); *H04B 1/40* (2013.01); *H04W 88/085* (2013.01)

(58) Field of Classification Search
None
See application file for complete search history.

(56) References Cited

U.S. PATENT DOCUMENTS 4,365,865 A 12/1982 Stiles
4,867,527 A 9/1989 Dotti et al.
(Continued)

FOREIGN PATENT DOCUMENTS

AU 645192 B2 1/1994
AU 731180 B2 3/2001
(Continued)

OTHER PUBLICATIONS

Notification of Grant for Chinese patent application 201190000473.1 dated Aug. 28, 2013, 4 pages.
(Continued)

*Primary Examiner* — Darren E Wolf
(74) *Attorney, Agent, or Firm* — C. Keith Montgomery

(57) ABSTRACT

Embodiments of the disclosure relate to digital-analog interface modules (DAIMs) for flexibly distributing digital and/or analog communications signals in wide-area analog distributed antenna systems (DASs). In this regard, in one aspect, a DAIM is a multi-functional device capable of distributing the digital and/or analog communications signals to a local-area DASs in a wide-area DAS. The DAIM comprises an analog radio frequency (RF) communications signal interface for coupling with an analog signal source, a digital communications interface for coupling with a digital signal source, an analog local distribution interface for coupling with a remote antenna unit (RAU), and at least one digital remote distribution interface for coupling with a head-end unit (HEU) of the local-area DAS. By employing the DAIM in the wide-area DAS, it is possible to flexibly reconfigure the wide-area DAS for distributing digital and/or analog communications signals over the digital communications mediums.

27 Claims, 16 Drawing Sheets

Related U.S. Application Data

(60) Provisional application No. 62/093,643, filed on Dec. 18, 2014.

(51) Int. Cl.
  *H04B 10/50* (2013.01)
  *H04B 10/60* (2013.01)
  *H04W 88/08* (2009.01)
  *H04B 1/40* (2015.01)

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,067,053 A | 5/2000 | Runyon et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |

(56) References Cited

U.S. PATENT DOCUMENTS

| | | |
|---|---|---|
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,185 B1 | 5/2005 | Chung et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,940,916 B1 | 9/2005 | Warner et al. |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 | 9/2006 | O'Sullivan et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,277,679 B1 | 10/2007 | Barratt et al. |
| 7,286,507 B1 | 10/2007 | Oh et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |

(56) References Cited

U.S. PATENT DOCUMENTS

| | | |
|---|---|---|
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,493,129 B1 | 2/2009 | Mostafa et al. |
| 7,496,070 B2 | 2/2009 | Vesuna |
| 7,496,384 B2 | 2/2009 | Seto et al. |
| 7,522,552 B2 | 4/2009 | Fein et al. |
| 7,542,452 B2 | 6/2009 | Penumetsa |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,599,420 B2 | 10/2009 | Forenza et al. |
| 7,606,594 B2 | 10/2009 | Jesse et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,153 B2 | 2/2010 | Zavadsky |
| 7,668,565 B2 | 2/2010 | Ylänen et al. |
| 7,684,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,042 B2 | 6/2011 | Deas |
| 7,962,176 B2 | 6/2011 | Li et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,005,152 B2 | 8/2011 | Wegener |
| 8,010,116 B2 | 8/2011 | Scheinert |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,155,525 B2 | 4/2012 | Cox |
| 8,174,428 B2 | 5/2012 | Wegener |
| 8,208,434 B2 | 6/2012 | Sayana et al. |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,290,483 B2 | 10/2012 | Sabat, Jr. et al. |
| 8,306,563 B2 | 11/2012 | Zavadsky et al. |
| 8,346,091 B2 | 1/2013 | Kummetz et al. |
| 8,346,160 B2 | 1/2013 | Kummetz |
| 8,346,278 B2 | 1/2013 | Wala et al. |
| 8,422,884 B2 | 4/2013 | Mao |
| 8,428,510 B2 | 4/2013 | Stratford et al. |
| 8,457,562 B2 | 6/2013 | Zavadsky et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,532,566 B2 | 9/2013 | Dussmann |
| 8,548,526 B2 | 10/2013 | Schmidt et al. |
| 8,583,100 B2 | 11/2013 | Koziy et al. |
| 8,606,110 B2 | 12/2013 | Rospsha et al. |
| 8,626,245 B2 | 1/2014 | Zavadsky et al. |
| 8,634,766 B2 | 1/2014 | Hobbs et al. |
| 8,681,917 B2 | 3/2014 | McAllister et al. |
| 8,682,338 B2 | 3/2014 | Lemson et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,792,933 B2 | 7/2014 | Chen |
| 8,837,659 B2 | 9/2014 | Uyehara et al. |
| 8,837,940 B2 | 9/2014 | Smith et al. |
| 8,908,607 B2 | 12/2014 | Kummetz et al. |
| 8,929,288 B2 | 1/2015 | Stewart et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,037,143 B2 | 5/2015 | Berlin et al. |
| 9,042,732 B2 | 5/2015 | Cune et al. |
| 9,270,374 B2 | 2/2016 | Cune et al. |
| 9,325,429 B2 | 4/2016 | Berlin et al. |
| 9,525,488 B2 | 12/2016 | Beamon et al. |
| 9,602,176 B2 | 3/2017 | Schmid et al. |
| 9,642,102 B2 | 5/2017 | Machida |
| 9,806,797 B2 | 10/2017 | Berlin et al. |
| 2001/0000621 A1 | 5/2001 | Mitsuda et al. |
| 2001/0036163 A1 | 11/2001 | Sabat, Jr. et al. |
| 2001/0053011 A1 | 12/2001 | Imajo |
| 2002/0003645 A1 | 1/2002 | Kim et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0055371 A1 | 5/2002 | Amon et al. |

(56) References Cited

U.S. PATENT DOCUMENTS

| | | |
|---|---|---|
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Amon et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0176354 A1 | 11/2002 | Chiodini |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037300 A1 | 2/2004 | Lehr et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0049321 A1 | 3/2004 | Lehr et al. |
| 2004/0078151 A1 | 4/2004 | Aljadeff et al. |
| 2004/0090366 A1 | 5/2004 | Wong et al. |
| 2004/0100930 A1 | 5/2004 | Shapira et al. |
| 2004/0105435 A1 | 6/2004 | Morioka |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0131125 A1 | 7/2004 | Sanderford, Jr. et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0175177 A1* | 9/2004 | Lee .................... H04B 10/2503 398/72 |
| 2004/0198451 A1 | 10/2004 | Varghese |
| 2004/0202257 A1 | 10/2004 | Mehta et al. |
| 2004/0203339 A1 | 10/2004 | Bauman |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0230846 A1 | 11/2004 | Mancey et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0220458 A1 | 10/2005 | Kupershmidt et al. |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0019604 A1 | 1/2006 | Hasarchi |
| 2006/0045054 A1 | 3/2006 | Utsumi et al. |
| 2006/0053324 A1 | 3/2006 | Giat et al. |
| 2006/0062579 A1 | 3/2006 | Kim et al. |
| 2006/0079290 A1 | 4/2006 | Seto et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0222369 A1 | 10/2006 | Kim et al. |
| 2006/0233506 A1 | 10/2006 | Noonan et al. |
| 2006/0239630 A1 | 10/2006 | Hase et al. |
| 2006/0267843 A1 | 11/2006 | Sakama et al. |
| 2006/0274704 A1 | 12/2006 | Desai et al. |
| 2007/0008939 A1 | 1/2007 | Fischer |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0157251 A1 | 7/2007 | Shrivastava et al. |
| 2007/0166042 A1 | 7/2007 | Seeds et al. |
| 2007/0208961 A1 | 9/2007 | Ghoshal et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0274279 A1 | 11/2007 | Wood et al. |
| 2007/0285239 A1 | 12/2007 | Easton et al. |
| 2007/0286599 A1 | 12/2007 | Sauer et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0043784 A1 | 2/2008 | Wilcox |
| 2008/0044186 A1 | 2/2008 | George et al. |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0094285 A1 | 4/2008 | Hansen |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |

(56) References Cited

U.S. PATENT DOCUMENTS

| | | |
|---|---|---|
| 2008/0159226 A1 | 7/2008 | He et al. |
| 2008/0159744 A1 | 7/2008 | Soto et al. |
| 2008/0165720 A1 | 7/2008 | Hu et al. |
| 2008/0166094 A1 | 7/2008 | Bookbinder et al. |
| 2008/0168283 A1 | 7/2008 | Penning |
| 2008/0181282 A1 | 7/2008 | Wala et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0279299 A1* | 11/2008 | Reuven ............ H04L 25/03318 375/267 |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180423 A1 | 7/2009 | Kroener |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0221249 A1 | 9/2009 | Aue et al. |
| 2009/0238307 A1* | 9/2009 | Singh ................ H03K 5/135 375/332 |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0009394 A1 | 1/2010 | Guo |
| 2010/0009694 A1 | 1/2010 | Fischer |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0067426 A1 | 3/2010 | Voschina et al. |
| 2010/0067906 A1 | 3/2010 | Adhikari et al. |
| 2010/0080154 A1 | 4/2010 | Noh et al. |
| 2010/0080182 A1 | 4/2010 | Kubler et al. |
| 2010/0083330 A1 | 4/2010 | Bernstein et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0150034 A1 | 6/2010 | Song et al. |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1 | 8/2010 | Franklin |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0316609 A1 | 12/2010 | Dewhurst et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pemu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0070821 A1 | 3/2011 | Chun et al. |
| 2011/0071734 A1 | 3/2011 | Van Wiemeersch et al. |
| 2011/0086614 A1 | 4/2011 | Brisebois et al. |
| 2011/0105016 A1 | 5/2011 | Saito et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0135308 A1 | 6/2011 | Tarlazzi et al. |
| 2011/0141895 A1 | 6/2011 | Zhang |
| 2011/0149879 A1 | 6/2011 | Noriega et al. |
| 2011/0158297 A1 | 6/2011 | Ding et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |

(56) References Cited

U.S. PATENT DOCUMENTS

| | | |
|---|---|---|
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0243291 A1 | 10/2011 | McAllister et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0316755 A1 | 12/2011 | Ayatollahi et al. |
| 2012/0106657 A1 | 5/2012 | Fischer et al. |
| 2012/0139793 A1 | 6/2012 | Sharawi |
| 2012/0140690 A1 | 6/2012 | Choi et al. |
| 2012/0177026 A1 | 7/2012 | Uyehara et al. |
| 2012/0263098 A1 | 10/2012 | Takahashi et al. |
| 2012/0296816 A1 | 11/2012 | Kim et al. |
| 2012/0307719 A1 | 12/2012 | Nakasato |
| 2012/0314797 A1 | 12/2012 | Kummetz et al. |
| 2012/0314813 A1 | 12/2012 | Loyez et al. |
| 2012/0322477 A1 | 12/2012 | Kang et al. |
| 2013/0012195 A1 | 1/2013 | Sabat, Jr. et al. |
| 2013/0017863 A1 | 1/2013 | Kummetz et al. |
| 2013/0034358 A1 | 2/2013 | Sung et al. |
| 2013/0040676 A1 | 2/2013 | Kang et al. |
| 2013/0089336 A1 | 4/2013 | Dahlfort et al. |
| 2013/0095870 A1 | 4/2013 | Phillips et al. |
| 2013/0107763 A1 | 5/2013 | Uyehara et al. |
| 2013/0114963 A1 | 5/2013 | Stapleton et al. |
| 2013/0121703 A1 | 5/2013 | Kummetz et al. |
| 2013/0150063 A1 | 6/2013 | Berlin et al. |
| 2013/0188753 A1 | 7/2013 | Tarlazzi et al. |
| 2013/0188959 A1 | 7/2013 | Cune et al. |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0272202 A1 | 10/2013 | Stapleton et al. |
| 2013/0330086 A1 | 12/2013 | Berlin et al. |
| 2014/0006931 A1 | 1/2014 | Pettitt et al. |
| 2014/0016583 A1 | 1/2014 | Smith |
| 2014/0036770 A1 | 2/2014 | Stapleton et al. |
| 2014/0050482 A1 | 2/2014 | Berlin et al. |
| 2014/0050483 A1 | 2/2014 | Berlin et al. |
| 2014/0057627 A1 | 2/2014 | Hejazi et al. |
| 2014/0069318 A1 | 3/2014 | Johnson et al. |
| 2014/0079112 A1 | 3/2014 | Ranson et al. |
| 2014/0105056 A1 | 4/2014 | Li et al. |
| 2014/0112667 A1 | 4/2014 | Neukirch et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0150063 A1 | 5/2014 | Bone |
| 2014/0204900 A1 | 7/2014 | Kawasaki |
| 2014/0219140 A1 | 8/2014 | Uyehara et al. |
| 2014/0241224 A1 | 8/2014 | Fischer et al. |
| 2014/0243033 A1 | 8/2014 | Wala et al. |
| 2014/0248050 A1 | 9/2014 | Crilly, Jr. et al. |
| 2014/0269318 A1 | 9/2014 | Hasarchi et al. |
| 2014/0269859 A1 | 9/2014 | Hanson et al. |
| 2014/0286643 A1 | 9/2014 | George et al. |
| 2014/0287677 A1 | 9/2014 | Machida |
| 2014/0308043 A1 | 10/2014 | Heidler et al. |
| 2014/0308044 A1 | 10/2014 | Heidler et al. |
| 2014/0314061 A1 | 10/2014 | Trajkovic et al. |
| 2015/0049663 A1 | 2/2015 | Mukherjee et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0155942 A1 | 6/2015 | Baker et al. |
| 2015/0180575 A1 | 6/2015 | Bruckman |
| 2015/0382292 A1 | 12/2015 | Heidler et al. |
| 2016/0013844 A1 | 1/2016 | Berlin et al. |
| 2016/0113844 A1 | 1/2016 | Berlin et al. |
| 2016/0036505 A1 | 2/2016 | George et al. |
| 2016/0080082 A1 | 3/2016 | Lemson et al. |
| 2016/0087724 A1 | 3/2016 | Liu et al. |
| 2016/0134348 A1 | 5/2016 | George et al. |
| 2016/0173201 A1 | 6/2016 | Cune et al. |
| 2016/0204878 A1 | 7/2016 | Goodwill |
| 2016/0219591 A1 | 7/2016 | Lee et al. |
| 2016/0295565 A1 | 10/2016 | Kim et al. |
| 2016/0380359 A1 | 12/2016 | Cooper et al. |
| 2017/0047998 A1 | 2/2017 | Palanisamy et al. |
| 2017/0062952 A1 | 3/2017 | Sundararajan et al. |
| 2017/0201322 A1 | 7/2017 | Harel et al. |
| 2017/0207548 A1 | 7/2017 | Schwartzman et al. |
| 2017/0207853 A1 | 7/2017 | Harel et al. |
| 2017/0237493 A1 | 8/2017 | Hazani et al. |
| 2017/0237497 A1 | 8/2017 | Yogeeswaran et al. |
| 2017/0244541 A1 | 8/2017 | McAllister et al. |

FOREIGN PATENT DOCUMENTS

| | | |
|---|---|---|
| CA | 2065090 C | 2/1998 |
| CA | 2242707 C | 9/2002 |
| CA | 2815509 C | 5/2012 |
| CN | 1745560 A | 3/2006 |
| CN | 101076961 A | 11/2007 |
| CN | 101090299 A | 12/2007 |
| CN | 101151811 A | 3/2008 |
| CN | 101296525 A | 10/2008 |
| CN | 101346006 A | 1/2009 |
| CN | 101496306 A | 7/2009 |
| CN | 101542928 A | 9/2009 |
| CN | 201315588 Y | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0766343 A2 | 4/1997 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 1357683 B1 | 5/2009 |
| EP | 2110955 A1 | 10/2009 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |

(56) References Cited

FOREIGN PATENT DOCUMENTS

| | | |
|---|---|---|
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| KR | 2012035459 A | 4/2012 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2009145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A1 | 4/2012 |
| WO | 2012051230 A1 | 4/2012 |
| WO | 2012054553 A1 | 4/2012 |
| WO | 2012058182 A1 | 5/2012 |
| WO | 2012100468 A1 | 8/2012 |
| WO | 2012170865 A2 | 12/2012 |
| WO | 2013009835 A1 | 1/2013 |
| WO | 2013063025 A1 | 5/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

International Search Report for PCT/US2011/034725 dated Aug. 5, 2011, 4 pages.
Non-final Office Action for U.S. Appl. No. 12/892,424 dated Nov. 5, 2012, 22 pages.
International Search Report and Written Opinion for PCT/US2011/034738 dated Jul. 27, 2011, 13 pages.
International Search Report for PCT/US2011/047821 dated Oct. 25, 2011, 4 pages.
International Preliminary Report on Patentability for PCT/US2011/047821 dated Feb. 19, 2013, 10 pages.
Non-final Office Action for U.S. Appl. No. 13/025,719 dated Sep. 11, 2013, 18 pages.
Parker et al., "Radio-over-fibre technologies arising from the Building the future Optical Network in Europe (BONE) Project," IET Optoelectron., 2010, vol. 4, Issue 6, pp. 247-259.
Singh et al., "Distributed coordination with deaf neighbors: efficient medium access for 60 GHz mesh networks," IEEE INFOCOM 2010 proceedings, 9 pages.
Examination Report for European patent application 11754570.7 dated Nov. 18, 2013, 7 pages.
Final Office Action for U.S. Appl. No. 13/025,719 dated Dec. 31, 2013, 20 pages.
Advisory Action for U.S. Appl. No. 13/025,719 dated Mar. 14, 2014, 6 pages.
Non-final Office Action for U.S. Appl. No. 13/785,603 dated Dec. 23, 2013, 15 pages.
Final Office Action for U.S. Appl. No. 13/785,603 dated Apr. 14, 2014, 17 pages.
Advisory Action for U.S. Appl. No. 13/785,603 dated Jun. 30, 2014, 3 pages.
Non-final Office Action for U.S. Appl. No. 13/785,603 dated Sep. 9, 2014, 10 pages.
Final Office Action for U.S. Appl. No. 13/785,603 dated Dec. 4, 2014, 8 pages.
Non-final Office Action for U.S. Appl. No. 13/762,432 dated Aug. 20, 2014, 4 pages.
Notice of Allowance for U.S. Appl. No. 13/762,432 dated Dec. 24, 2014, 7 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/055861 dated Feb. 7, 2012, 4 pages.

(56) References Cited

OTHER PUBLICATIONS

International Preliminary Report on Patentability for PCT/US2011/055861 dated Apr. 25, 2013, 9 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/034733 dated Aug. 1, 2011, 5 pages.
International Preliminary Report on Patentability for PCT/US2011/034733 dated Nov. 15, 2012, 8 pages.
First Office Action for Chinese patent application 201180024499.4 dated Dec. 1, 2014, 13 pages.
Examination Report for European patent application 11754570.7 dated Jan. 13, 2015, 5 pages.
Final Office Action for U.S. Appl. No. 13/967,426 dated Apr. 29, 2015, 22 pages.
Advisory Action for U.S. Appl. No. 14/664,305, dated Oct. 30, 2017, 3 pages.
Notice of Allowance for U.S. Appl. No. 14/664,305, dated Dec. 1, 2017, 19 pages.
Cooper, A.J., "Fibre/Radio for the Provision of Cordless/Mobile Telephony Services in the Access Network," Electronics Letters, 1990, pp. 2054-2056, vol. 26, No. 24.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
International Search Report for PCT/US07/21041 dated Mar. 7, 2008, 3 pages.
No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.
No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.
Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2002, pp. 271-282.

Opatic, D., "Radio over Fiber Technology for Wireless Access," Ericsson, Oct. 17, 2009, 6 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept in Wireless Network Infrastructure," Electronics Letters, Feb. 27, 1997, vol. 33, No. 5, pp. 404-406.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Author Unknown, "ADC Has 3rd Generation Services Covered at CeBIT 2001," Business Wire, Mar. 20, 2001, 3 pages.
Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Fitzmaurice, M. et al., "Distributed Antenna System for Mass Transit Communications," Vehicular Technology Conference, Boston, Massachusetts, Sep. 2000, IEEE, pp. 2011-2018.
Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.
Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.
Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.
Lee, D. et al., "Ricocheting Bluetooth," 2nd International Conference on Microwave and Millimeter Wave Technology Proceedings, Beijing, China, Sep. 2000, IEEE, pp. 432-435.
Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.
Schuh et al., "Hybrid Fibre Radio Access: A Network Operators Approach and Requirements," Proceedings of the 10th Microcoll Conference, Mar. 21-24, 1999, Budapest, Hungary, pp. 211-214.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Margotte, B. et al., "Fibre Optic Distributed Antenna System for Cellular and PCN/PCS Indoor Coverage," Microwave Engineering Europe, Jun. 1998, 6 pages.
Matsunaka et al., "Point-to-multipoint Digital Local Distribution Radio System in the 21 GHz Band," KDD Technical Journal, Mar. 1991, No. 145, p. 43-54.
Translation of the First Office Action for Chinese patent application 201180039569.3 dated Jan. 16, 2015, 7 pages.
International Search Report for PCT/US2012/025337 dated May 16, 2012, 4 pages.
Non-final Office Action for U.S. Appl. No. 13/025,719 dated Mar. 31, 2015, 26 pages.
Non-final Office Action for U.S. Appl. No. 13/967,426 dated Dec. 26, 2014, 15 pages.

(56) References Cited

OTHER PUBLICATIONS

Patent Cooperation Treaty, International Search Report for PCT/IL2015/051219, dated Mar. 17, 2016, 5 pages.
Patent Cooperation Treaty, International Search Report for PCT/IL2015/051217, dated Mar. 17, 2016, 5 pages.
Final Office Action for U.S. Appl. No. 14/711,306 dated Jul. 9, 2015, 16 pages.
Advisory Action for U.S. Appl. No. 13/967,426 dated Jul. 6, 2015, 3 pages.
Examination Report for European patent application 11721160.7 dated Oct. 21, 2015, 7 pages.
Translation of the Second Office Action for Chinese patent application 201180024499.4 dated Aug. 17, 2015, 3 pages.
Advisory Action for U.S. Appl. No. 14/711,306 dated Oct. 8, 2015, 3 pages.
Non-final Office Action for U.S. Appl. No. 13/967,426 dated Sep. 17, 2015, 27 pages.
Mohammed, Maalim, et al., "New Compact Design of Dual Notched Bands UWB Antenna with Slots in Radiating and Feeding Elements," IEEE Student Conference on Research and Development, Dec. 16-17, 2013, Putrajaya, Malaysia, IEEE, pp. 374-379.
International Search Report and Written Opinion for PCT/IL2015/051205 dated Mar. 10, 2016, 14 pages.
International Search Report for PCT/IL2015/051219 dated Mar. 17, 2016, 5 pages.
International Search Report and Written Opinion for PCT/IL2015/051217 dated Mar. 17, 2016, 14 pages.
International Search Report and Written Opinion for PCT/IL2015/051095 dated Mar. 2, 2016, 14 pages.
International Search Report and Written Opinion for PCT/IL2015/051061 dated Feb. 15, 2016, 12 pages.
Notice of Allowance for U.S. Appl. No. 13/025,719 dated Aug. 11, 2016, 8 pages.
Non-final Office Action for U.S. Appl. No. 14/664,305 dated Jul. 7, 2016, 45 pages.
Final Office Action for U.S. Appl. No. 14/664,305, dated Dec. 23, 2016, 24 pages.
Non-final Office Action for U.S. Appl. No. 15/049,913 dated Jun. 16, 2016, 20 pages.
Final Office Action for U.S. Appl. No. 15/049,913, dated Nov. 25, 2016, 16 pages.
Notice of Allowance and Examiner-Initiated Interview Summary for U.S. Appl. No. 15/098,941, dated Jul. 14, 2016, 18 pages.
Corrected Notice of Allowability for U.S. Appl. No. 15/098,941, dated Jul. 27, 2016, 5 pages.
Advisory Action for U.S. Appl. No. 15/049,913, dated Feb. 15, 2017, 3 pages.
Non-Final Office Action for U.S. Appl. No. 15/381,952, dated Jan. 27, 2017, 14 pages.
International Search Report for PCT/IL2015/050970, dated May 9, 2016, 6 pages.
International Preliminary Report on Patentability for PCT/IL2015/050970, dated Apr. 6, 2017, 17 pages.
Non-Final Office Action for U.S. Appl. No. 14/496,507, dated Feb. 24, 2017, 15 pages.
Advisory Action for U.S. Appl. No. 14/664,305, dated Mar. 1, 2017, 3 pages.
Non-Final Office Action for U.S. Appl. No. 14/664,305, dated Apr. 7, 2017, 34 pages.
Non-Final Office Action for U.S. Appl. No. 15/332,505, dated Apr. 5, 2017, 24 pages.
Author Unknown, "Fiber Optic Distributed Antenna System," Installation and Users Guide, ERAU Version 1.5, May 2002, Andrews Corporation, 53 pages.
Translation of the First Office Action for Chinese Patent Application No. 201610029179.2, dated Jul. 27, 2017, 19 pages.
Invitation to Pay Fees for International Patent Application No. PCT/IL2015/050970, dated Feb. 17, 2016, 6 pages.
Final Office Action for U.S. Appl. No. 14/664,305, dated Sep. 5, 2017, 34 pages.
Examiner's Answer to the Appeal Brief for U.S. Appl. No. 15/049,913, dated Jun. 22, 2017, 22 pages.
Notice of Allowance for U.S. Appl. No. 15/332,505, dated Aug. 31, 2017, 8 pages.
Notice of Allowance for U.S. Appl. No. 15/381,952, dated May 9, 2017, 7 pages.
Notice of Allowance for U.S. Appl. No. 15/381,952, dated Jul. 31, 2017, 7 pages.
Final Office Action for U.S. Appl. No. 14/496,507, dated Sep. 28, 2017, 21 pages.
Non-Final Office Action for U.S. Appl. No. 15/473,827, dated Sep. 22, 2017, 38 pages.
Examiner's Answer to the Appeal Brief for U.S. Appl. No. 14/496,507, dated Jul. 12, 2018, 25 pages.
Second Examiner's Answer to the Appeal Brief for U.S. Appl. No. 14/496,507, dated Jul. 20, 2018, 25 pages.
Decision on Request for Rehearing for U.S. Appl. No. 15/049,913, dated Jul. 26, 2018, 5 pages.
Notice of Allowance for U.S. Appl. No. 15/475,589, dated Jun. 28, 2018, 7 pages.
Notice of Allowance for U.S. Appl. No. 15/584,189, dated Jul. 18, 2018, 8 pages.
Notice of Allowance for U.S. Appl. No. 15/473,977, dated Jun. 11, 2018, 7 pages.
Translation of the Second Office Action for Chinese Patent Application No. 201610029179.2, dated Feb. 1, 2018, 3 pages.
Decision on Appeal for U.S. Appl. No. 15/049,913, dated Apr. 19, 2018, 8 pages.
Final Office Action for U.S. Appl. No. 15/473,827, dated Jan. 26, 2018, 40 pages.
Advisory Action for U.S. Appl. No. 15/473,827, dated Apr. 9, 2018, 3 pages.
Notice of Allowance for U.S. Appl. No. 15/475,589, dated Feb. 7, 2018, 9 pages.
Non-Final Office Action for U.S. Appl. No. 15/584,189, dated Apr. 4, 2018, 12 pages.

* cited by examiner

DIGITAL-ANALOG INTERFACE MODULES (DAIMS) FOR FLEXIBLY DISTRIBUTING DIGITAL AND/OR ANALOG COMMUNICATIONS SIGNALS IN WIDE-AREA ANALOG DISTRIBUTED ANTENNA SYSTEMS (DASS)

PRIORITY APPLICATION

This application is a continuation of International Application No. PCT/IL15/051219 filed on Dec. 16, 2015 and claims the benefit of priority under 35 U.S.C. § 119 of U.S. Provisional Application No. 62/093,643 filed on Dec. 18, 2014, the content of which are relied upon and incorporated herein by reference in their entireties.

BACKGROUND

The disclosure relates generally to distribution of communications signals in a distributed antenna system (DAS), and more particularly to flexibly distributing digital and/or analog communications signals between analog DASs over digital communications mediums.

Wireless customers are increasingly demanding digital data services, such as streaming video signals. Concurrently, some wireless customers use their wireless devices in areas that are poorly served by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive radio frequency (RF) signals from a source. DASs include remote antenna units (RAUs) configured to receive and transmit communications signals to client devices within the antenna range of the RAUs.

A typical DAS comprises a head-end unit communicatively coupled to one or more remote unit groups, each comprising at least one remote unit. The remote unit may be an RAU that is configured to wirelessly distribute communications signals to and from the head-end unit. The head-end unit is configured to receive and distribute the communications signals to a variety of wireless services, such as wideband code division multiple access (WCDMA), long-term evolution (LTE), and wireless local area network (WLAN) communications services. To distribute such wireless communications services in a DAS, the wireless communications services can be provided in the form of digital communications signals and/or analog communications signals to the head-end unit of the DAS. Thus, the DAS may be configured to receive and distribute the digital communications signals and/or analog communications signals in either analog or digital form. Analog communications signals may be directly modulated onto a carrier signal for transmission over an analog communications medium. Digital communications signals, in contrast, are signals generated by sampling and digitizing an analog communications signal before modulating onto the carrier signal. DASs configured to directly distribute analog communications signals may be referred to as analog DASs. DASs configured to directly distribute digital communications signals may be referred to as digital DASs.

No admission is made that any reference cited herein constitutes prior art. Applicant expressly reserves the right to challenge the accuracy and pertinency of any cited documents.

SUMMARY

Embodiments of the disclosure relate to digital-analog interface modules (DAIMs) and digital interface modules (DIMs) for flexibly distributing digital and/or analog communications signals in wide-area analog distributed antenna systems (DASs). A wide-area DAS typically comprises a plurality of local-area DASs interconnected via digital communications mediums. Any of the plurality of local-area DASs may be configured as a main DAS to efficiently receive and redistribute digital and/or analog communications signals to rest of the local-area DASs in the wide-area DAS. In a non-limiting example, the main DAS in the wide-area DAS may be collocated with installed telecommunications equipment (e.g., base transceiver stations and digital baseband units) to avoid additional installation costs, reduce power consumption, and improve operation efficiency.

In this regard, in one embodiment, a DAIM is provided as multi-functional equipment in the main DAS for receiving and redistributing digital and/or analog communications signals to rest of the local-area DASs in the wide-area DAS. The DAIM comprises an analog radio frequency (RF) communications signal interface for coupling with an analog signal source, a digital communications interface for coupling with a digital signal source, an analog local distribution interface for coupling with a remote antenna unit (RAU), and at least one digital remote distribution interface for coupling with a head-end unit (HEU) of a local-area DAS. Furthermore, a plurality of DAIMs may be interconnected via respective digital bus interfaces to concurrently support the plurality of local-area DASs in the wide-area DAS. In another embodiment, a DIM is provided in the main DAS as an alternative to the DAIM. The DIM is a modified DAIM and comprises a digital communications interface for coupling with a digital signal source, an analog local distribution interface for coupling with an analog signal source, and at least one digital remote distribution interface for coupling with the HEU of the remote local-area DAS. Furthermore, a plurality of DIMs may be interconnected via the respective digital bus interfaces to concurrently support the plurality of local-area DASs in the wide-area DAS. By employing the DAIM or the DIM in the wide-area DAS, it is possible to flexibly reconfigure the wide-area DAS for distributing digital and/or analog communications signals over the digital communications mediums.

An additional embodiment of the disclosure relates to a DAIM in a main DAS to support a wide-area DAS. The DAIM comprises an analog communications interface configured to receive a downlink analog communications signal from at least one of an analog signal source and a baseband signal source. The DAIM also comprises at least one digital remote distribution interface to be coupled with a remote DAS component in a remote DAS in the wide-area DAS. The DAIM also comprises an analog local distribution interface configured to distribute a downlink analog RF signal to an RAU in the main DAS. The DAIM also comprises an RF conditioning circuit coupled to the analog communications interface and the analog local distribution interface. The RF conditioning circuit is configured to receive the downlink analog communications signal from the analog signal source. The RF conditioning circuit is also configured to convert the downlink analog communications signal into the downlink analog RF signal adapted for distribution in the wide-area DAS. The RF conditioning circuit is also configured to provide the downlink analog RF signal to the analog local distribution interface. The RF conditioning circuit is also configured to provide the downlink analog RF signal to an analog-to-digital (A/D) converter.

The DAIM also comprises the A/D converter coupled to the RF conditioning circuit. The A/D converter is configured to convert the downlink analog RF signal to generate a downlink digital RF signal. The DAIM also comprises a digital signal processing circuit coupled to the A/D converter and the at least one digital remote distribution interface. The digital signal processing circuit is configured to receive the downlink digital RF signal from the A/D converter. The digital signal processing circuit is also configured to convert the downlink digital RF signal to generate one or more first downlink digital RF signals. The digital signal processing circuit is also configured to combine one or more respective first downlink digital RF signals to generate a combined downlink digital RF signal. The digital signal processing circuit is also configured to provide the combined downlink digital RF signal to the at least one digital remote distribution interface to be distributed to the remote DAS component.

An additional embodiment of the disclosure relates to an optical fiber-based wide-area DAS. The optical fiber-based wide-area DAS comprises a main DAS comprising a main HEU, wherein the main HEU comprises one or more DAIMs. Each of the one or more DAIMs is coupled to a respective optical fiber-based downlink digital communications medium via a respective electrical-to-optical (E/O) converter and is coupled to a respective optical fiber-based uplink digital communications medium via a respective optical-to-electrical (O/E) converter. The optical fiber-based wide-area DAS also comprises one or more remote DASs comprising one or more remote HEUs, respectively. A remote HEU among the one or more remote HEUs comprises one or more remote-HEU DIMs corresponding to one or more RF bands, respectively, wherein at least one remote-HEU DIM among the one or more remote-HEU DIMs comprised in the remote HEU is configured to interface with a respective DAIM in the main HEU. The at least one at least one remote-HEU DIM configured to interface with the respective DAIM in the main HEU is coupled to the respective optical fiber-based downlink digital communications medium via a respective remote-HEU O/E converter and is coupled to the respective optical fiber-based uplink digital communications medium via a respective remote-HEU E/O converter. The remote HEU among the one or more remote HEUs also comprises a remote-HEU RF combiner/splitter coupled to the one or more remote-HEU DIMs. The remote HEU among the one or more remote HEUs also comprises a remote-HEU optical splitter/combiner coupled to the remote-HEU RF combiner/splitter. The remote HEU among the one or more remote HEUs also comprises one or more remote-HEU optical interface modules (OIMs) coupled to the remote-HEU optical splitter/combiner, wherein the one or more remote-HEU OIMs are coupled with one or more remote-DAS RAUs.

An additional embodiment of the disclosure relates to a method for reconfiguring an existing HEU in a DAS with DAIMs. The method comprises replacing one or more radio interface modules (RIMs) in the existing HEU with one or more DAIMs. For each of the one or more DAIMs, the method comprises coupling an analog communications interface comprised in the DAIM to a respective analog signal source. For each of the one or more DAIMs, the method also comprises coupling a digital communications interface comprised in the DAIM to a respective digital signal source. For each of the one or more DAIMs, the method also comprises coupling at least one digital remote distribution interface comprised in the DAIM to a respective downlink digital communications medium and a respective uplink digital communications medium. For each of the one or more DAIMs, the method also comprises coupling an analog local distribution interface comprised in the DAIM to a respective RAU.

Additional features and advantages will be set forth in the detailed description which follows, and in part will be readily apparent to those skilled in the art from the description or recognized by practicing the embodiments as described in the written description and claims hereof, as well as the appended drawings.

The drawings illustrate one or more embodiment(s), and together with the description serve to explain principles and operation of the various embodiments.

DETAILED DESCRIPTION

Embodiments of the disclosure relate to digital-analog interface modules (DAIMs) and digital interface modules (DIMs) for flexibly distributing digital and/or analog communications signals in wide-area analog distributed antenna systems (DASs). A wide-area DAS typically comprises a plurality of local-area DASs interconnected via digital communications mediums. Any of the plurality of local-area DASs may be configured as a main DAS to efficiently receive and redistribute digital and/or analog communications signals to rest of the local-area DASs in the wide-area DAS. In a non-limiting example, the main DAS in the wide-area DAS may be collocated with installed telecommunications equipment (e.g., base transceiver stations and digital baseband units) to avoid additional installation costs, reduce power consumption, and improve operation efficiency.

In this regard, in one aspect, a DAIM is provided as multi-functional equipment in the main DAS for receiving and redistributing digital and/or analog communications signals to rest of the local-area DASs in the wide-area DAS. The DAIM comprises an analog radio frequency (RF) communications signal interface for coupling with an analog signal source, a digital communications interface for coupling with a digital signal source, an analog local distribution interface for coupling with a remote antenna unit (RAU), and at least one digital remote distribution interface for coupling with a head-end unit (HEU) of a local-area DAS. Furthermore, a plurality of DAIMs may be interconnected via respective digital bus interfaces to concurrently support the plurality of local-area DASs in the wide-area DAS.

In another aspect, a DIM is provided in the main DAS as an alternative to the DAIM. The DIM is a modified DAIM and comprises a digital communications interface for coupling with a digital signal source, an analog local distribution interface for coupling with an analog signal source, and at least one digital remote distribution interface for coupling with the HEU of the remote local-area DAS. Furthermore, a plurality of DIMs may be interconnected via the respective digital bus interfaces to concurrently support the plurality of local-area DASs in the wide-area DAS.

By employing the DAIM or the DIM in the wide-area DAS, it is possible to flexibly reconfigure the wide-area DAS for distributing digital and/or analog communications signals over the digital communications mediums.

Figure 1:
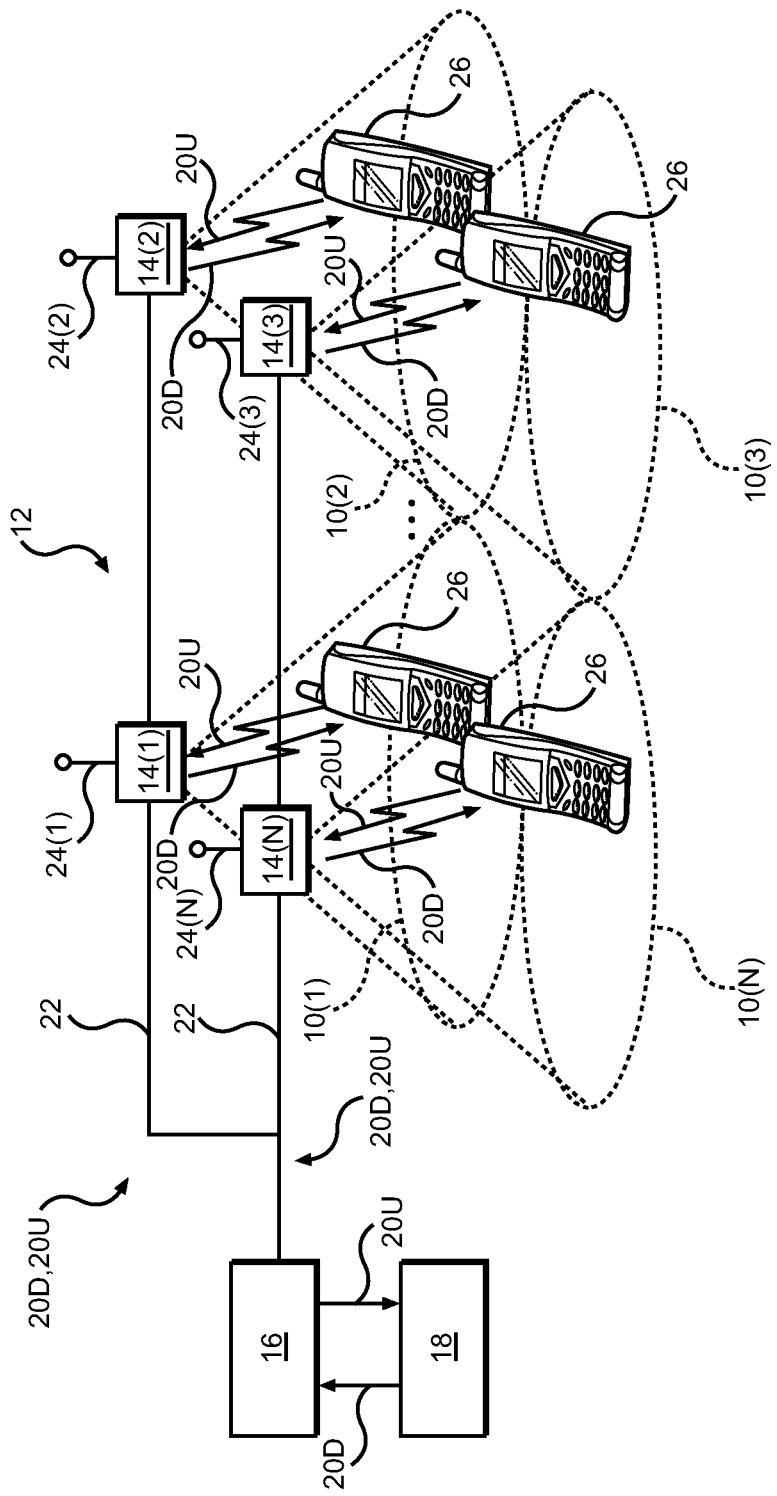
FIG. 1 is a schematic diagram of an exemplary analog distributed antenna system (DAS)
Figure 2:
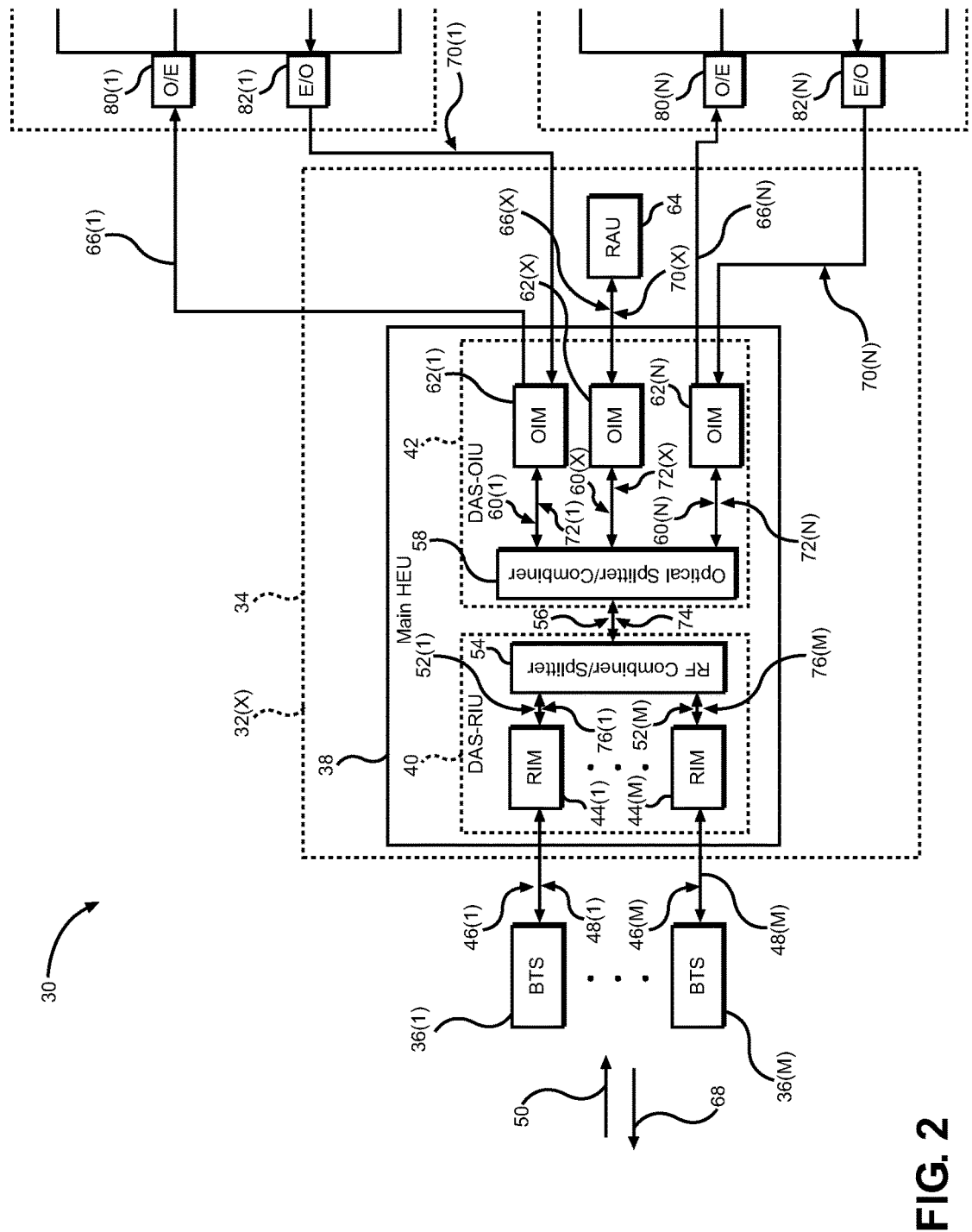
FIG. 2 is a schematic diagram of an exemplary wide-area analog DAS consisting of a plurality of local-area analog DASs wherein a local-area analog DAS among the plurality of local-area analog DASs is configured as a main analog DAS of the wide-area analog DAS.
Figure 2:
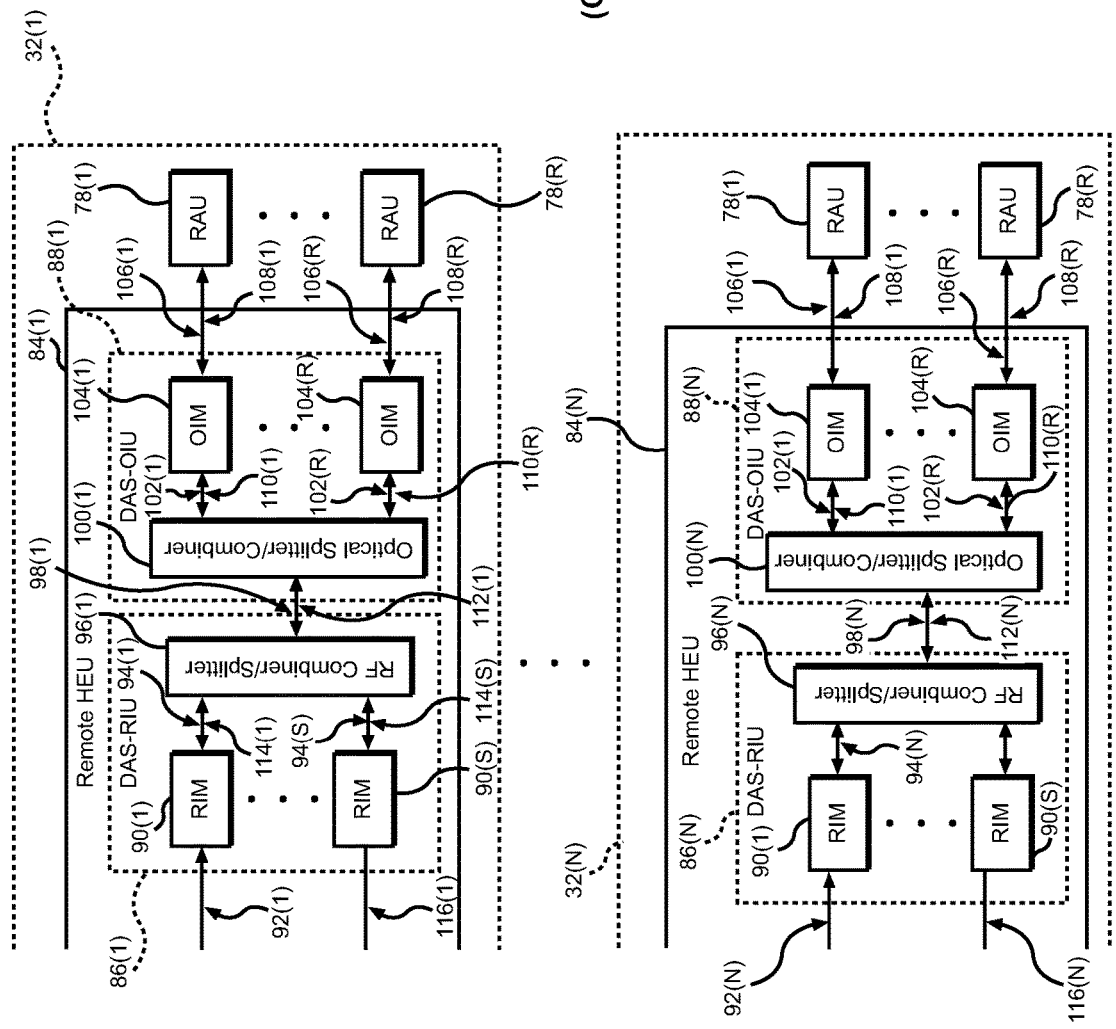
Figure 3:
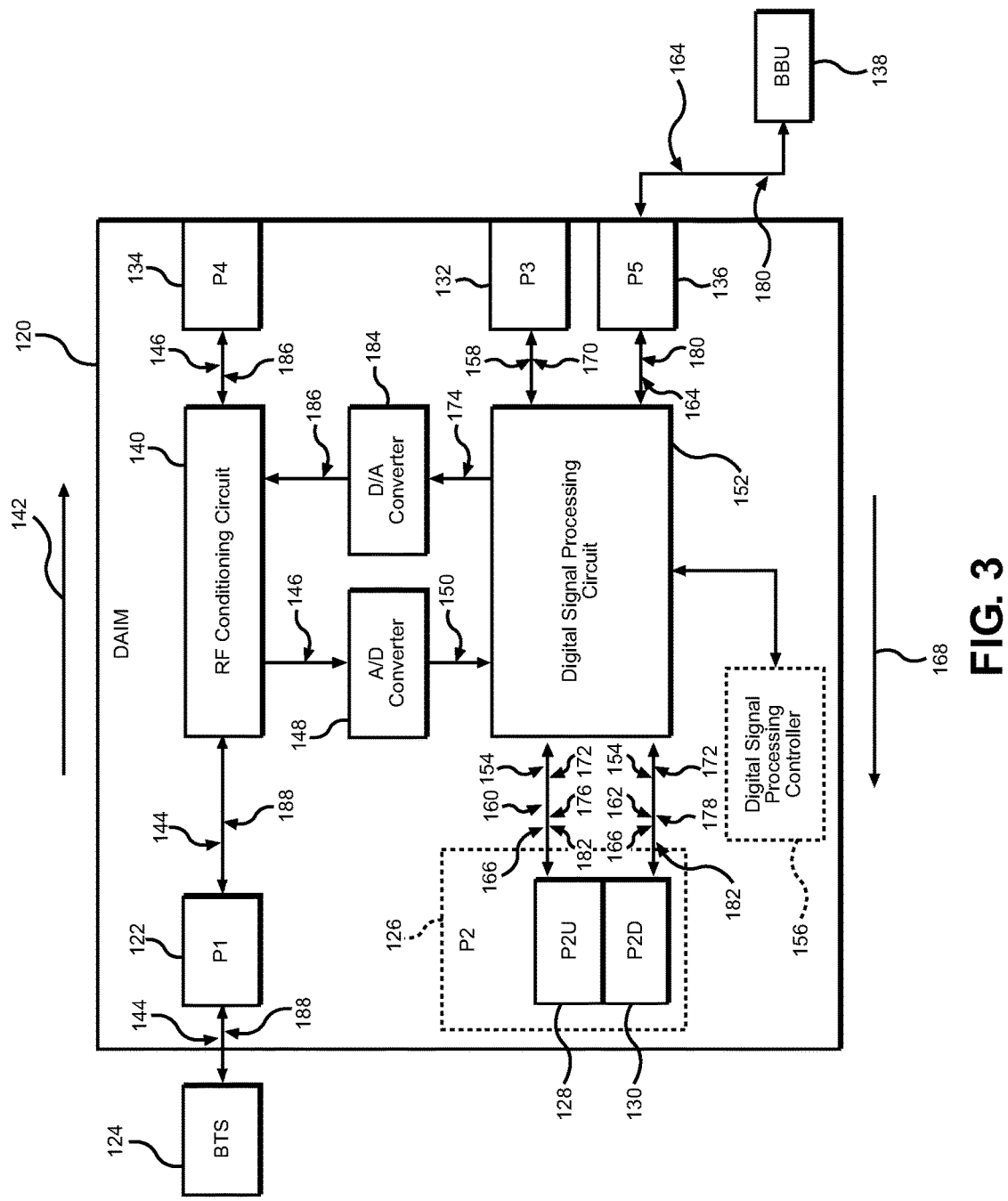
FIG. 3 is a schematic diagram of an exemplary digital-analog interface module (DAIM) configured to be retrofitted into the chassis of a main head-end unit (HEU) in the wide-area analog DAS of FIG. 2 for distributing digital and/or analog communications signals in the wide-area analog DAS over digital communications mediums.

Before discussing examples of a DAIM supporting flexible distribution of digital and/or analog communications signals between analog DASs starting at FIG. 3, discussions of an exemplary local-area analog DAS and an exemplary wide-area analog DAS that support only analog wireless communications services are first provided with references to FIGS. 1 and 2. The discussion of specific exemplary aspects of flexibly distributing digital and/or analog communications signals between analog DASs using the DAIM is provided starting at FIG. 3.

In this regard, FIG. 1 illustrates distribution of wireless communications services to coverage areas 10(1)-10(N) of an analog DAS 12, wherein 'N' is the number of coverage areas. These wireless communications services can include cellular services, wireless services such as radio frequency (RF) identification (RFID) tracking, Wireless Fidelity (Wi-Fi), local area network (LAN), and combinations thereof, as examples. The coverage areas 10(1)-10(N) may be remotely located. In this regard, the remote coverage areas 10(1)-10(N) are created by and centered on remote antenna units (RAUs) 14(1)-14(N) connected to a head-end unit (HEU) 16 (e.g., a head-end controller or head-end equipment or central unit). The HEU 16 may be communicatively coupled to a base transceiver station (BTS) 18. In this regard, the HEU 16 receives downlink analog RF communications signals 20D from the BTS 18 to be distributed to the remote antenna units 14(1)-14(N). The remote antenna units 14(1)-14(N) are configured to receive the downlink analog RF communications signals 20D from the HEU 16 over an analog communications medium 22 to be distributed to the respective remote coverage areas 10(1)-10(N) of the remote antenna units 14(1)-14(N). In a non-limiting example, the analog communications medium 22 may be a wired communications medium, a wireless communications medium, or an optical fiber-based communications medium. Each remote antenna unit 14(1)-14(N) may include an RF transmitter/receiver (not shown) and a respective antenna 24(1)-24(N) operably connected to the RF transmitter/receiver to wirelessly distribute the wireless communications services to client devices 26 within their respective remote coverage areas 10(1)-10(N). The remote antenna units 14(1)-14(N) are also configured to receive analog uplink RF communications signals 20U from the client devices 26 in their respective remote coverage areas 10(1)-10(N) to be distributed to the BTS 18. The size of a given remote coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. The client devices 26 usually have a fixed maximum RF receiver sensitivity, so that the above-mentioned properties of the remote antenna units 14(1)-14(N) mainly determine the size of their respective remote coverage areas 10(1)-10(N).

The analog DAS 12 is typically deployed to extend indoor coverage of the wireless communications services inside a building. In this regard, the analog DAS 12 may be considered as a local-area DAS for the building. In some cases, a wide-area analog DAS is deployed to provide the wireless communications service to multiple buildings each covered by a local-area DAS like the analog DAS 12. In this regard, FIG. 2 is a schematic diagram of an exemplary wide-area analog DAS 30 consisting of a plurality of local-area analog DASs 32(1)-32(N) wherein a local-area analog DAS 32(X) (1≤X≤N) among the plurality of local-area analog DASs 32(1)-32(N) is configured as a main analog DAS 34 of the wide-area analog DAS 30. In this regard, the wide-area analog DAS 30 is configured according to a star-topology, wherein the main analog DAS 34 serves as a gateway for rest of the plurality of local-area analog DASs 32(1)-32(N) in the wide-area analog DAS 30. The star-topology allows adding a new local-area analog DAS or removing an existing local-area analog DAS without impacting operations of the wide-area analog DAS 30.

In this regard, with continuing reference to FIG. 2, in a non-limiting example, the main analog DAS 34 comprised in the local-area analog DAS 32(X) may be collocated with one or more BTSs 36(1)-36(M). The main analog DAS 34 comprises a main HEU 38, which is a main DAS component and comprises a main-HEU DAS radio interface unit (RIU) (DAS-RIU) 40 and a main-HEU DAS optical interface unit (OIU) (DAS-OIU) 42. In a non-limiting example, the main HEU 38 may be a central unit. The main-HEU DAS-RIU 40 comprises one or more main-HEU RIMs 44(1)-44(M) coupled to the one or more BTSs 36(1)-36(M) for communicating one or more downlink analog RF communications signals 46(1)-46(M) and one or more uplink analog RF communications signals 48(1)-48(M), respectively. On a downlink direction 50, the one or more main-HEU RIMs 44(1)-44(M) adapt the one or more downlink analog RF communications signals 46(1)-46(M) into one or more downlink analog RF signals 52(1)-52(M) that are suited for distribution in the wide-area analog DAS 30. The one or more downlink analog RF signals 52(1)-52(M) are provided to an RF combiner/splitter 54 wherein the one or more downlink analog RF signals 52(1)-52(M) are combined to generate a combined downlink analog RF signal 56. The combined downlink analog RF signal 56 is subsequently received by an optical splitter/combiner 58 in the main-HEU DAS-OIU 42, wherein the combined downlink analog RF signal 56 is first split and then recombined to generate a plurality of second downlink analog RF signals 60(1)-60(N). The main-HEU DAS-OIU 42 comprises a plurality of OIMs 62(1)-62(N) that correspond to the plurality of local-area analog DASs 32(1)-32(N), respectively. Among the plurality of OIMs 62(1)-62(N), the OIM 62(X) (1≤X≤N) is configured to be coupled to an RAU 64 that is associated with the main analog DAS 34. In this regard, the RAU 64 is also a main DAS component. The plurality of OIMs 62(1)-62(N) receives and converts the plurality of second downlink analog RF signals 60(1)-60(N) into a plurality of combined downlink optical RF signals 66(1)-66(N), respectively. Among the plurality of combined downlink optical RF signals 66(1)-66(N), the combined downlink optical RF signal 66(X) (1≤X≤N) is provided to the RAU 64 while the rest of the plurality of combined downlink optical RF signals 66(1)-66(N) are provided to the plurality of local-area analog DASs 32(1)-32(N), respectively.

With continuing reference to FIG. 2, in an uplink direction 68, the plurality of OIMs 62(1)-62(N) receive a plurality of combined uplink optical RF signals 70(1)-70(N) from the plurality of local-area analog DASs 32(1)-32(N), respectively. Among the plurality of combined uplink optical RF signals 70(1)-70(N), the combined uplink optical RF signal 70(X) (1≤X≤N) may be received from the RAU 64. The plurality of OIMs 62(1)-62(N) convert the plurality of combined uplink optical RF signals 70(1)-70(N) into a plurality of second uplink analog RF signals 72(1)-72(N). The plurality of second uplink analog RF signals 72(1)-72(N) are received by the optical splitter/combiner 58 wherein the plurality of second uplink analog RF signals 72(1)-72(N) are split and recombined to generate a combined uplink analog RF signal 74. The combined uplink analog RF signal 74 is subsequently received by the RF combiner/splitter 54 wherein the combined uplink analog RF signal 74 is split into one or more uplink analog RF signals 76(1)-76(M). The one or more main-HEU RIMS 44(1)-44(M) adapt the one or more uplink analog RF signals 76(1)-76(M) to generate the one or more uplink analog RF communications signals 48(1)-48(M) that are suited for distribution to the one or more BTSs 36(1)-36(M).

With continuing reference to FIG. 2, in contrast to the local-area analog DAS 32(X) that is configured as the main analog DAS 34, the rest of the plurality of local-area analog DASs 32(1)-32(N) may be treated as remote local-area analog DASs in the wide-area analog DAS 30. On the downlink direction 50, each of the plurality of local-area analog DASs 32(1)-32(N) receives a respective downlink optical RF signal among the plurality of combined downlink optical RF signals 66(1)-66(N) from the main analog DAS 34 and distributes to one or more respective RAUs 78(1)-78(R), wherein 'R' may represent a different positive integer number among the plurality of local-area analog DASs 32(1)-32(N). In this regard, the one or more respective RAUs 78(1)-78(R) are one or more remote DAS components. In the uplink direction 68, each of the plurality of local-area analog DASs 32(1)-32(N) provides a respective uplink optical RF signal among the plurality of combined uplink optical RF signals 70(1)-70(N) to the main analog DAS 34. In this regard, the local-area analog DAS 32(1) is discussed next as a non-limiting example of the functional aspects involved in the plurality of local-area analog DASs 32(1)-32(N) (N≠X).

With continuing reference to FIG. 2, the local-area analog DAS 32(1) comprises an optical-to-electrical (O/E) converter 80(1) and an electrical-to-optical (E/O) converter 82(1). The local-area analog DAS 32(1) also comprises a remote HEU 84(1) that is coupled to the O/E converter 80(1) and the E/O converter 82(1). In this regard, the plurality of local-area analog DASs 32(1)-32(N) comprises a plurality of remote HEUs 84(1)-84(N), respectively. In a non-limiting example, the plurality of remote HEUs 84(1)-84(N) is also a plurality of remote DAS components. The remote HEU 84(1) further comprises a remote-HEU DAS-RIU 86(1) and a remote-HEU DAS-OIU 88(1). The remote-HEU DAS-RIU 86(1) comprises one or more remote-HEU RIMs 90(1)-90(S), wherein 'S' may represent a different positive integer number among the plurality of local-area analog DASs 32(1)-32(N). The O/E converter 80(1) converts the combined downlink optical RF signal 66(1) into a remote-HEU combined downlink analog RF signal 92(1), which is subsequently received by the one or more remote-HEU RIMs 90(1)-90(S). The one or more remote-HEU RIMs 90(1)-90(S) then generates one or more remote-HEU downlink analog RF signals 94(1)-94(S), wherein each of the one or more remote-HEU downlink analog RF signals 94(1)-94(S) corresponds to a respective RF band (not shown). The one or more remote-HEU downlink analog RF signals 94(1)-94(S) are received by a remote-HEU RF combiner/splitter 96(1) and combined into a second remote-HEU combined downlink analog RF signal 98(1). The second remote-HEU combined downlink analog RF signal 98(1) is received by a remote-HEU optical splitter/combiner 100(1), wherein second remote-HEU combined downlink analog RF signal 98(1) is first split and then recombined to generate one or more third remote-HEU combined downlink analog RF signals 102(1)-102(R). Each of the one or more third remote-HEU combined downlink analog RF signals 102(1)-102(R) corresponds to a RAU among the one or more RAUs 78(1)-78(R) and may comprise one or more RF bands. The remote-HEU DAS-OIU 88(1) comprises one or more remote-HEU OIMs 104(1)-104(R) that correspond to the one or more respective RAUs 78(1)-78(R), respectively. The one or more remote-HEU OIMs 104(1)-104(R) receive and convert the one or more third remote-HEU combined downlink analog RF signals 102(1)-102(R) into one or more remote-HEU combined downlink optical RF signals 106(1)-106(R), respectively. The one or more remote-HEU combined downlink optical RF signals 106(1)-106(R) are then distributed to the one or more respective RAUs 78(1)-78(R).

With continuing reference to FIG. 2, on the uplink direction 68, the one or more remote-HEU OIMs 104(1)-104(R) receive one or more remote-HEU combined uplink optical RF signals 108(1)-108(R) from the one or more respective RAUs 78(1)-78(R), respectively. The one or more remote-HEU OIMs 104(1)-104(R) then convert the one or more remote-HEU combined uplink optical RF signals 108(1)-108(R) into one or more third remote-HEU combined uplink analog RF signals 110(1)-110(R). Each of the one or more third remote-HEU combined uplink analog RF signals 110(1)-110(R) corresponds to one or more RF bands. The one or more third remote-HEU combined uplink analog RF signals 110(1)-110(R) are received by the remote-HEU optical splitter/combiner 100(1), wherein the one or more third remote-HEU combined uplink analog RF signals 110(1)-110(R) are combined into a second remote-HEU combined uplink analog RF signal 112(1). The second remote-HEU combined uplink analog RF signal 112(1) is subsequently received by the remote-HEU RF combiner/splitter 96(1) wherein the second remote-HEU combined uplink analog RF signal 112(1) is split into one or more remote-HEU uplink analog RF signals 114(1)-114(S). Each of the one or more remote-HEU uplink analog RF signals 114(1)-114(S) corresponds to the respective RF band. The one or more remote-HEU uplink analog RF signals 114(1)-114(S) are then combined into a remote-HEU combined uplink analog RF signal 116(1), which is subsequently converted to the combined uplink optical RF signal 70(1) and provided to the OIM 62(1) in the main analog DAS 34.

As digital communication technologies become increasingly reliable and cost-effective, the wide-area analog DAS 30 may need to be upgraded to distribute digital and/or analog communications signals between the plurality of local-area analog DASs 32(1)-32(N) over digital communications mediums. As a result, the main analog DAS 34 and the plurality of local-area analog DASs 32(1)-32(N) may need to be upgraded for distributing the digital and/or analog communications signals over the digital communications mediums. It may be desirable to retrofit new multi-functional equipment into the chassis of the installed equipment to reduce upgrade costs and minimize service disruptions to the wide-area analog DAS 30. In a non-limiting example, it is desirable to be able to retrofit the new multi-functional equipment into the chassis of the main HEU 38 and/or the plurality of remote HEUs 84(1)-84(N).

In this regard, FIG. 3 is a schematic diagram of an exemplary digital-analog interface module (DAIM) 120 that is retrofitted into the chassis of the main HEU 38 in the wide-area analog DAS 30 of FIG. 2 for distributing digital and/or analog communications signals in the wide-area analog DAS 30 over digital communications mediums. In essence, the DAIM 120 is multi-functional device capable of distributing digital and/or analog communications signals to the plurality of local-area analog DASs 32(1)-32(N) in the wide-area analog DAS 30. Elements in FIG. 2 are referenced in connection with FIG. 3 and will not be re-described herein.

With reference to FIG. 3, the DAIM 120 comprises an analog communications interface (P1) 122 configured to be coupled with an analog signal source 124 for distributing analog communications signals. In a non-limiting example, the analog signal source 124 may be a BTS. The DAIM 120 also comprises a digital bus interface (P2) 126, which further comprises an upstream digital bus interface (P2U) 128 and a downstream digital bus interface (P2D) 130. As will be further discussed in detail below in FIGS. 5A and 5B, the upstream digital bus interface 128 and the downstream digital bus interface 130 enables the DAIM 120 to be interconnected with other DAIMs to enable flexible digital signal sharing with the other DAIMs. The DAIM 120 also comprises at least one digital remote distribution interface (P3) 132 configured to be coupled with any remote HEU among the plurality of remote HEUs 84(1)-84(N) (not shown). The DAIM 120 also comprises an analog local distribution interface (P4) 134 for distributing analog RF signals to the RAU 64 (not shown). The DAIM 120 also comprises a digital communications interface (P5) 136 to be coupled to a digital signal source 138 for distributing digital communications signals. In a non-limiting example, the digital signal source 138 may be a digital baseband unit (BBU).

With continuing reference to FIG. 3, the DAIM 120 further comprises an RF conditioning circuit 140 that is coupled to the analog communications interface 122 and the analog local distribution interface 134. In a downlink direction 142, the RF conditioning circuit 140 receives a downlink analog communications signal 144 from the analog signal source 124 via the analog communications interface 122. The RF conditioning circuit 140 converts the downlink analog communications signal 144 into a downlink analog RF signal 146, which is adapted for redistribution in the wide-area analog DAS 30. The RF conditioning circuit 140 then provides the downlink analog RF signal 146 to the analog local distribution interface 134 for distribution to the RAU 64. In addition, to provide a digitized version of the downlink analog RF signal 146 to be available for distribution, an analog-to-digital (A/D) converter 148 is provided. The A/D converter 148 converts the downlink analog RF signal 146 to generate a downlink digital RF signal 150 and provides the downlink digital RF signal 150 to a digital signal processing circuit 152. Upon receiving the downlink digital RF signal 150, the digital signal processing circuit 152 converts the downlink digital RF signal 150 into one or more first downlink digital RF signals 154 and provides the one or more first downlink digital RF signals 154 to the upstream digital bus interface 128 and the downstream digital bus interface 130.

Figure 5:
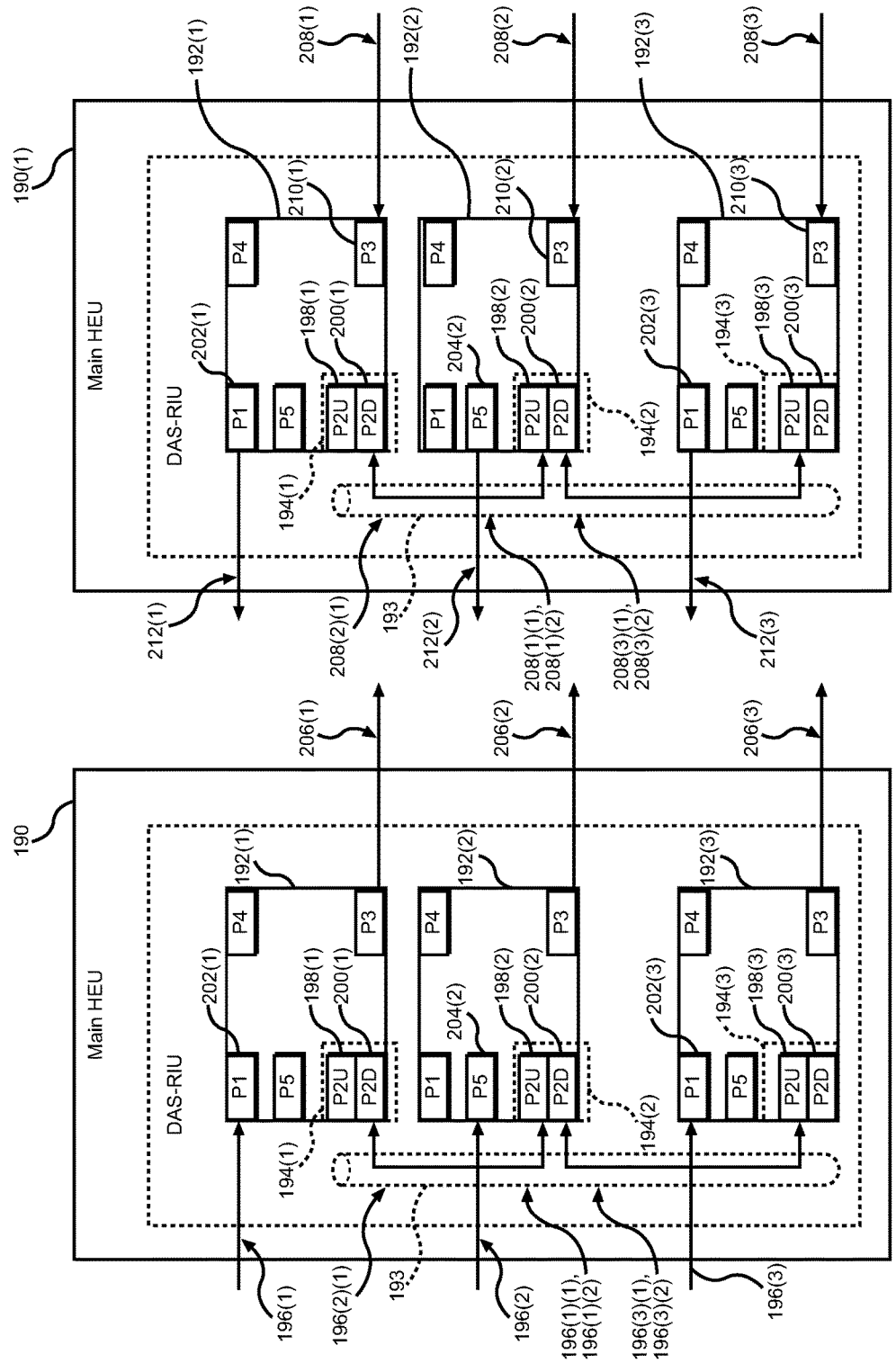
FIG. 5A is a schematic diagram of an exemplary main HEU comprising a plurality of DAIMs that are interconnected to an interconnection digital bus via a plurality of digital bus interfaces and configured to share a plurality of downlink communications signals.
FIG. 5B is a schematic diagram of an exemplary main HEU comprising the plurality of DAIMs in FIG. 5A that are interconnected to the interconnection digital bus in FIG. 5A via the plurality of digital bus interfaces in FIG. 5A and configured to share a plurality of uplink communications signals.

As will be further discussed in FIGS. 5A and 5B, providing the one or more first downlink digital RF signals 154 to the upstream digital bus interface 128 and the downstream digital bus interface 130 allows interconnected DAIMs to receive indirectly the one or more first downlink digital RF signals 154. Since not all of the one or more first downlink digital RF signals 154 are related to the DAIM 120, a digital signal processing controller 156 is configured to determine one or more respective first downlink digital RF signals (not shown), among the one or more first downlink digital RF signals 154, that are related to the DAIM 120. In a non-limiting example, the digital signal processing controller 156 may be provided inside or outside the DAIM 120. In a non-limiting example, the digital signal processing controller 156 is preconfigured to detect the one or more respective first downlink digital RF signals based on frequency-related information, such as channel number in a frequency-division duplex (FDD) signal or time slot number in a time-division duplex (TDD) signal, carried in the one or more first downlink digital RF signals 154. The digital signal processing controller 156 is communicatively coupled to the digital signal processing circuit 152 or embedded in the digital signal processing circuit 152. In this regard, the digital signal processing circuit 152 can combine the one or more respective first downlink digital RF signals to generate a combined downlink digital RF signal 158. Subsequently, the digital signal processing circuit 152 provides the combined downlink digital RF signal 158 to the digital remote distribution interface 132 for distribution to any remote HEU among the plurality of remote HEUs 84(1)-84(N).

With continuing reference to FIG. 3, the digital signal processing circuit 152 may receive one or more second downlink digital RF signals 160 from the upstream digital bus interface 128 and one or more third downlink digital RF signals 162 from the downstream digital bus interface 130. As will be further illustrated in FIGS. 5A and 5B, the one or more second downlink digital RF signals 160 and the one or more third downlink digital RF signals 162 are provided to the digital signal processing circuit 152 by other interconnected DAIMs. The digital signal processing circuit 152 in turn forwards the one or more second downlink digital RF signals 160 to the downstream digital bus interface 130 and forward the one or more third downlink digital RF signals 162 to the upstream digital bus interface 128. As previously discussed with regard to the one or more first downlink digital RF signals 154, the one or more second downlink digital RF signals 160 and the one or more third downlink digital RF signals 162 received from the digital bus interface 126 may not be related to the DAIM 120 as well. As such, the digital signal processing controller 156 is also configured to determine one or more respective second downlink digital RF signals (not shown) among the one or more second downlink digital RF signals 160 and one or more respective third downlink digital RF signals (not shown) among the one or more third downlink digital RF signals 162. In this regard, the digital signal processing circuit 152 can combine the one or more respective second downlink digital RF signals and the one or more respective third downlink digital RF signals into the combined downlink digital RF signal 158.

With continuing reference to FIG. 3, the digital signal processing circuit 152 may also receive a downlink digital baseband signal 164 from the digital signal source 138 that is coupled to the digital communications interface 136. In a non-limiting example, the downlink digital baseband signal 164 may be received from a BBU and is in compliance with a common public radio interface (CPRI) format. The digital signal processing circuit 152 is configured to convert the downlink digital baseband signal 164 to generate one or more fourth downlink digital RF signals 166. Accordingly, the digital signal processing circuit 152 provides the one or more fourth downlink digital RF signals 166 to the upstream digital bus interface 128 and the downstream digital bus interface 130. The digital signal processing controller 156, in turn, determines one or more respective fourth downlink digital RF signals (not shown) among the one or more fourth downlink digital RF signals 166 for combining with the combined downlink digital RF signal 158 by the digital signal processing circuit 152.

With continuing reference to FIG. 3, in an uplink direction 168, the digital signal processing circuit 152 receives a combined uplink digital RF signal 170 from any remote HEU among the plurality of remote HEUs 84(1)-84(N) (not shown) via the digital remote distribution interface 132. The digital signal processing circuit 152 splits the combined uplink digital RF signal 170 to generate one or more first uplink digital RF signals 172. The digital signal processing circuit 152 in turn provides the one or more first uplink digital RF signals 172 to the upstream digital bus interface 128 and the downstream digital bus interface 130. As previously discussed, the one or more first uplink digital RF signals 170 may or may not be related to the DAIM 120. As such, the digital signal processing controller 156 is also configured determine one or more respective first uplink digital RF signals (not shown) among the one or more first uplink digital RF signals 170. As a result, the digital signal processing circuit 152 can combine the one or more respective first uplink digital RF signals to generate an uplink digital RF signal 174.

With continuing reference to FIG. 3, the digital signal processing circuit 152 may receive one or more second uplink digital RF signals 176 from the upstream digital bus 128. The digital signal processing circuit 152 may also receive one or more third uplink digital RF signals 178 from the downstream digital bus 130. The digital signal processing circuit 152 in turn forwards the one or more second uplink digital RF signals 176 to the downstream digital bus interface 130 and forwards the one or more third uplink digital RF signals 178 to the upstream digital bus interface 128. The digital signal processing controller 156 is configured to determine one or more respective second uplink digital RF signals (not shown) among the one or more second uplink digital RF signals 176 and one or more respective third uplink digital RF signals (not shown) among the one or more third uplink digital RF signals 178. In this regard, the digital signal processing circuit 152 can combine the one or more respective second uplink digital RF signals and the one or more respective third uplink digital RF signals into the uplink digital RF signal 174.

With continuing reference to FIG. 3, the digital signal processing circuit 152 may also receive an uplink digital baseband signal 180 from the digital signal source 138 that is coupled to the digital communications interface 136. In a non-limiting example, the uplink digital baseband signal 180 may be received from a BBU and is in compliance with the CPRI format. The digital signal processing circuit 152 is configured to convert the uplink digital baseband signal 180 to generate one or more fourth uplink digital RF signals 182. Accordingly, the digital signal processing circuit 152 provides the one or more fourth uplink digital RF signals 182 to the upstream digital bus interface 128 and the downstream digital bus interface 130. The digital signal processing controller 156, in turn, determines one or more respective fourth downlink digital RF signals (not shown) among the one or more fourth downlink digital RF signals 182 for combining with the uplink digital RF signal 174 by the digital signal processing circuit 152.

With continuing reference to FIG. 3, the DAIM 120 further comprises a digital-to-analog (D/A) converter 184 that is coupled to the digital signal processing circuit 152 and the RF conditioning circuit 140. The D/A converter 184 receives and converts the uplink digital RF signal 174 to generate an uplink analog RF signal 186 and provides the uplink analog RF signal 186 to the RF conditioning circuit 140. Upon receiving the uplink analog RF signal 186, the RF conditioning circuit 140 provides the uplink analog RF signal 186 to the analog local distribution interface 134 for distribution to the RAU 64 (not shown). In another aspect, the RF conditioning circuit 140 converts the uplink analog RF signal 186 into an uplink analog communications signal 188, which is adapted for communications to the analog signal source 124. Subsequently, the RF conditioning circuit 140 provides the uplink analog communications signal 188 to the analog communications interface 122 for distribution to the analog signal source 124.

Figure 4:
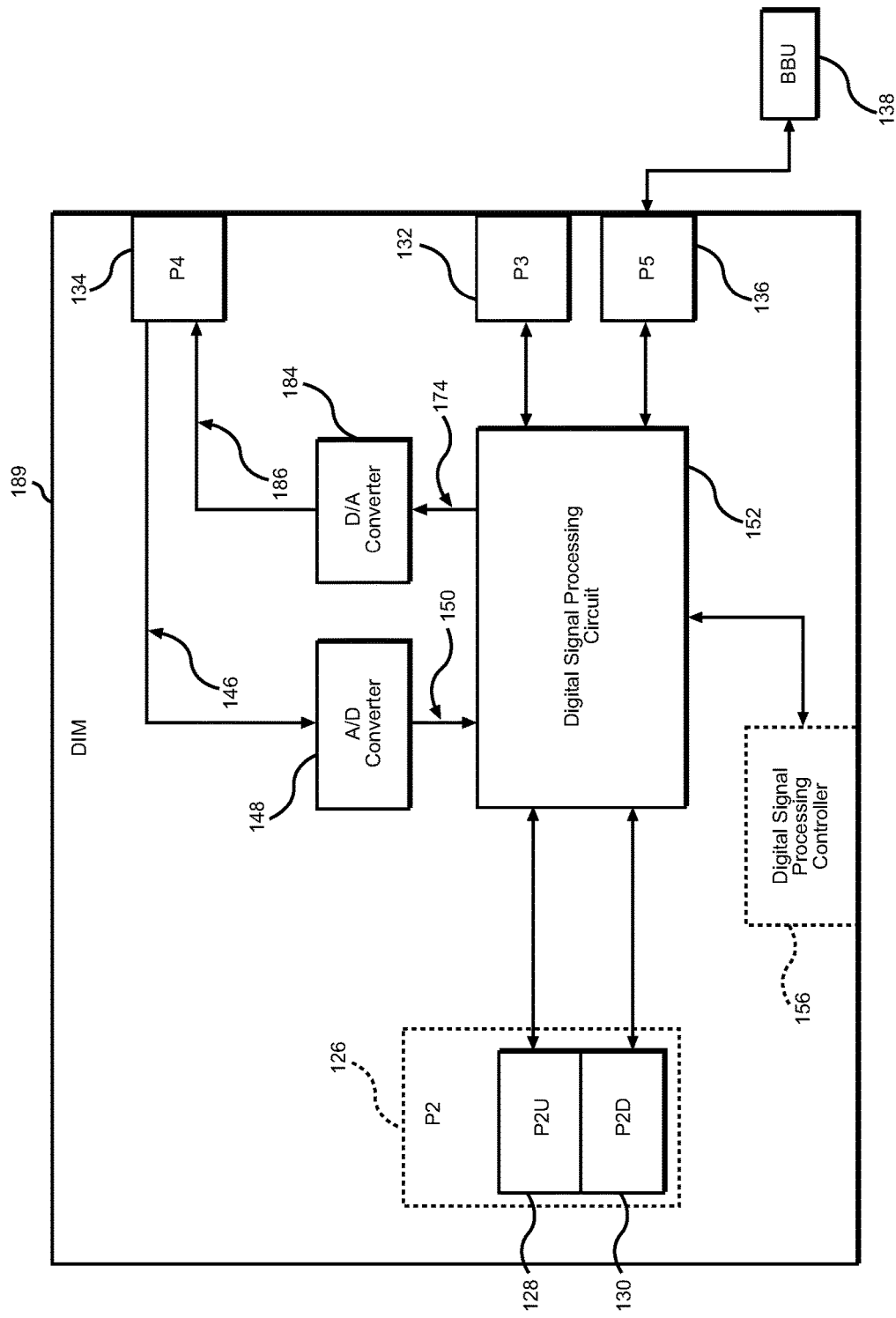
FIG. 4 is a schematic diagram of an exemplary digital interface module (DIM) that configured to be retrofitted into the chassis of a plurality of remote HEUs as well as a main HEU in the wide-area analog DAS of FIG. 2 for distributing digital and/or analog communications signals in the wide-area analog DAS over digital communications mediums.

The DAIM 120 in FIG. 3 is designed and configured to be retrofitted into the chassis of the main HEU 38 of the main analog DAS 34 in the wide-area analog DAS 30 for distributing the analog and/or digital communications signals in the wide-area analog DAS 30. Although it is also possible to retrofit the DAIM 120 into the chassis of the plurality of remote HEUs 84(1)-84(N) for supporting the local-area analog DASs 32(1)-32(N), the RF conditioning circuit 140 and the analog communications interface 122 in the DAIM 120 would not be utilized if the plurality of remote HEUs 84(1)-84(N) are not directly interacting with the one or more BTSs 36(1)-36(M). In this regard, FIG. 4 is a schematic diagram of an exemplary digital interface module (DIM) 189 that provides similar functionality to the DAIM 120 in FIG. 3. However, in the DIM 189 in FIG. 4, the analog communications interface 122 and the RF conditioning circuit 140 of the DIM 120 are not included. As a result, the A/D converter 148 and the D/A converter 184 of the DIM 120 are directly coupled to the analog local distribution interface 134 in the DIM 189 for receiving the downlink analog RF signal 146 and providing the uplink analog RF signal 186, respectively. Like the DAIM 120 in FIG. 3, the DIM 189 in FIG. 4 can be configured to be retrofitted into the chassis of the plurality of remote HEUs 84(1)-84(N) as well as the main HEU 38 in the wide-area analog DAS 30 of FIG. 2 for distributing digital and/or analog communications signals in the wide-area analog DAS 30 over digital communications mediums. Common elements between FIGS. 3 and 4 are shown therein with common element numbers, thus will not be re-described herein.

In this regard, with reference to FIG. 4, the A/D converter 148 in the DIM 189 receives the downlink analog RF signal 146 from the analog local distribution interface 134 and converts the downlink analog RF signal 146 into the downlink digital RF signal 150. The D/A converter 184 converts the uplink digital RF signal 174 into the uplink analog RF signal 186 and provides the uplink analog RF signal 186 to the analog local distribution interface 134. In a non-limiting example, the digital signal processing controller 156 may be provided inside or outside the DIM 189.

As previously discussed in reference to FIG. 3, the upstream digital bus interface 128 and the downstream digital bus interface 130 enables the DAIM 120 to be interconnected with other DAIMs to support a flexible topology of the wide-area analog DAS 30. In this regard, FIG. 5A is a schematic diagram of an exemplary main HEU 190 comprising a plurality of DAIMs 192(1)-192(3) that are interconnected to an interconnection digital bus 193 via a plurality of digital bus interfaces 194(1)-194(3) and configured to share a plurality of downlink communications signals 196(1)-196(3). The main HEU 190 may comprise any positive integer number of DAIMs 192. The plurality of DAIMs 192(1)-192(3) are provided as a non-limiting example and for the convenience of discussion.

With reference to FIG. 5A, the DAIM 192(1) has a logically configured downstream DAIM 192(2), but has no logically configured upstream DAIM since the DAIM 192(1) is the first DAIM among the plurality of DAIMs 192(1)-192(3). The DAIM 192(2) has a logically configured upstream DAIM 192(1) and a logically configured downstream DAIM 192(3). The DAIM 192(3) has a logically configured upstream DAIM 192(2), but has no logically configured downstream DAIM since the DAIM 192(3) is the last DAIM among the plurality of DAIMs 192(1)-192(3). The plurality of DAIMs 192(1)-192(3) have a plurality of upstream digital bus interfaces 198(1)-198(3) and a plurality of downstream digital bus interfaces 200(1)-200(3), respectively. To provide the interconnections between the plurality of DAIMs 192(1)-192(3), a downstream digital bus interface of a logically configured upstream DAIM is coupled to an upstream digital bus interface of a logically configured downstream DAIM. Hence, in the non-limiting example provided herein, the DAIM 192(1) is logically configured as an upstream DAIM to the DAIM 192(2). As such, a downstream digital bus interface 200(1) in the DAIM 192(1) is coupled to an upstream digital bus interface 198(2) in the DAIM 192(2). The DAIM 192(3) is logically configured as a downstream DAIM to the DAIM 192(3). As such, a downstream digital bus interface 200(2) in the DAIM 192(2) is coupled to an upstream digital bus interface 198(3) in the DAIM 192(3).

With continuing reference to FIG. 5A, the DAIM 192(1) receives a downlink communications signal 196(1) via an analog communications interface 202(1). The DAIM 192(1) converts the downlink communications signal 196(1) into downlink digital RF signals 196(1)(1), 196(1)(2) and provides the downlink digital RF signals 196(1)(1), 196(1)(2) to the interconnection digital bus 193 via the downstream digital bus interface 200(1). The DAIM 192(2) receives the downlink communications signal 196(2) via a digital communications interface 204(2). The DAIM 192(2) converts the downlink communications signal 196(2) into downlink digital RF signal 196(2)(1) and provides the downlink digital RF signal 196(2)(1) to the interconnection digital bus 193 via the upstream digital bus interface 198(2) and the downstream digital bus interface 200(2). The DAIM 192(3) receives the downlink communications signal 196(3) via an analog communications interface 202(3). The DAIM 192(3) converts the downlink communications signal 196(3) into downlink digital RF signals 196(3)(1), 196(3)(2) and provides the downlink digital RF signals 196(3)(1), 196(3)(2) to the interconnection digital bus 193 via the upstream digital bus interface 198(3). As a result, the downlink digital RF signals 196(1)(1), 196(1)(2), 196(2)(1), 196(3)(1), 196(3)(2) are made available to the DAIMs 192(1)-192(3) through the interconnection digital bus 193 in the main HEU 190. As previously discussed in FIG. 3, a respective digital signal processing controller (not shown) in each of the DAIMs 192(1)-192(3) can programmably determine which downlink digital RF signal(s) among the downlink digital RF signals 196(1)(1), 196(1)(2), 196(2)(1), 196(3)(1), 196(3)(2) is related to the respective DAIM and included in a plurality of combined downlink digital RF signals 206(1)-206(3), respectively.

FIG. 5B is a schematic diagram of an exemplary main HEU 190(1) comprising the plurality of DAIMs 192(1)-192(3) in FIG. 5A that are interconnected to the interconnection digital bus 193 via the plurality of digital bus interfaces 194(1)-194(3) in FIG. 5A and configured to share a plurality of combined uplink communications signals 208(1)-208(3). Common elements between FIGS. 5A and 5B are shown therein with common element numbers, thus will not be re-described herein.

With reference to FIG. 5B, the DAIM 192(1) receives the combined uplink communications signal 208(1) via at least one digital remote distribution interface 210(1). The DAIM 192(1) converts the combined uplink communications signal 208(1) into uplink digital RF signals 208(1)(1), 208(1)(2)

and provides the uplink digital RF signals 208(1)(1), 208(1)(2) to the interconnection digital bus 193 via the downstream digital bus interface 200(1). The DAIM 192(2) receives the combined uplink communications signal 208(2) via at least one digital remote distribution interface 210(2). The DAIM 192(2) converts the combined uplink communications signal 208(2) into uplink digital RF signal 208(2)(1) and provides the uplink digital RF signal 208(2)(1) to the interconnection digital bus 193 via the upstream digital bus interface 198(2) and the downstream digital bus interface 200(2). The DAIM 192(3) receives the combined uplink communications signal 208(3) via at least one digital remote distribution interface 210(3). The DAIM 192(3) converts the combined uplink communications signal 208(3) into uplink digital RF signals 208(3)(1), 208(3)(2) and provides the uplink digital RF signals 208(3)(1), 208(3)(2) to the interconnection digital bus 193 via the upstream digital bus interface 198(3). As a result, the uplink digital RF signals 208(1)(1), 208(1)(2), 208(2)(1), 208(3)(1), 208(3)(2) are made available to the plurality of DAIMs 192(1)-192(3) through the interconnection digital bus 193 in the main HEU 190(1). As previously discussed in FIG. 5A, the respective digital signal processing controller (not shown) in each of the DAIMs 192(1)-192(3) can programmably determine which uplink digital RF signal(s) among the uplink digital RF signals 208(1)(1), 208(1)(2), 208(2)(1), 208(3)(1), 208(3)(2) is related to the respective DAIM and included in a plurality of combined uplink communications signals 212(1)-212(3), respectively.

As previously discussed in FIGS. 3 and 4 above, the DAIM 120 and the DIM 189 are designed to retrofit into the chassis of the main HEU 38 and the plurality of remote HEUs 84(1)-84(N) in the wide-area analog DAS 30 of FIG. 2 for distributing the analog and/or digital communications signals in the wide-area in the wide-area analog DAS 30. By reconfiguring the main HEU 38 and the plurality of remote HEUs 84(1)-84(N) with the DAIM 120 and/or the DIM 189, it is possible to flexibly reconfigure the wide-area analog DAS 30 to distribute digital and/or analog communications signals over digital communications mediums.

Figure 6:
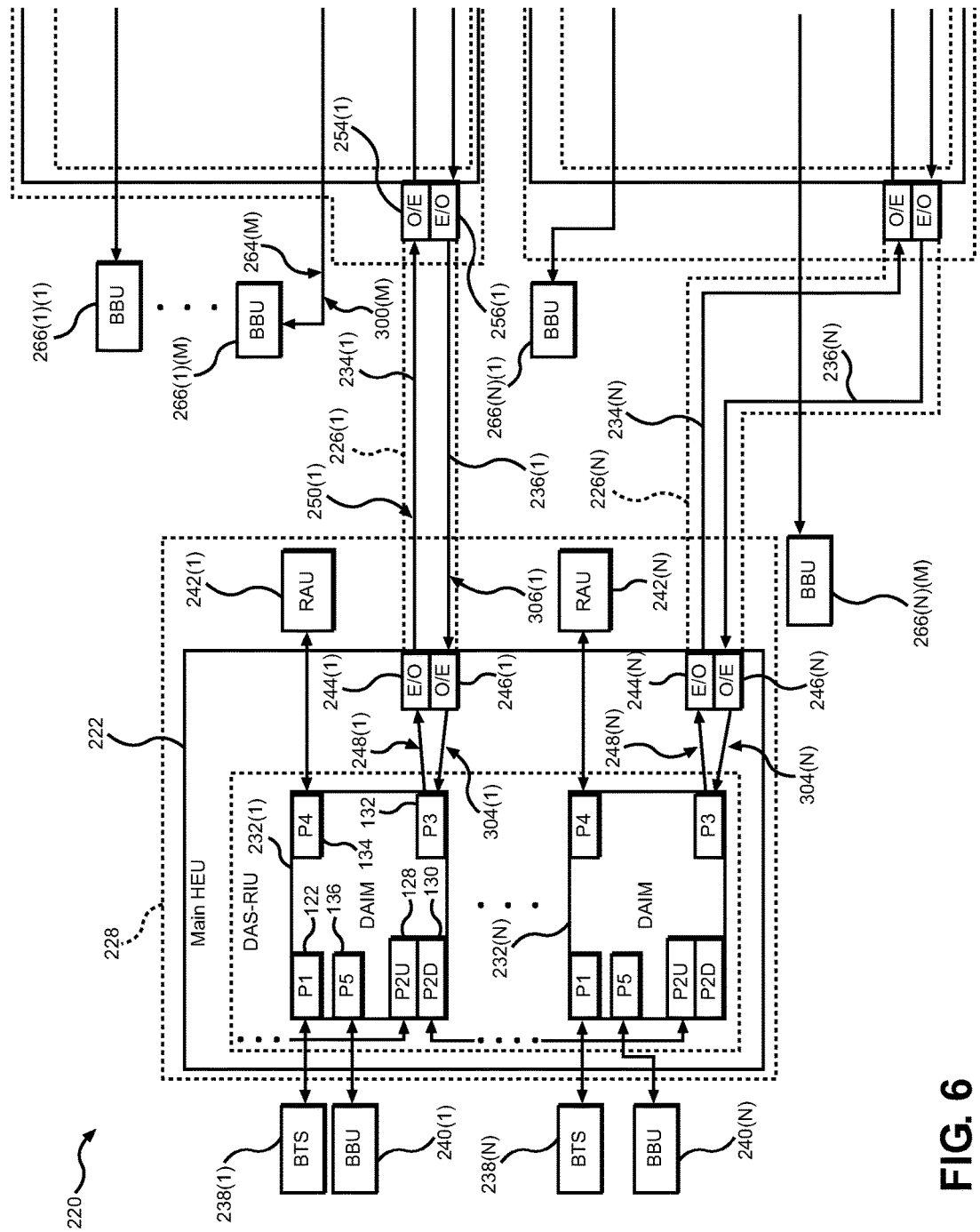
FIG. 6 is a schematic diagram of an exemplary optical fiber-based wide-area DAS configured to distribute digital and analog communications signals from a main HEU to one or more remote HEUs over optical fiber-based digital communications mediums, wherein the main HEU is reconfigured by retrofitting one or more of the DAIMs illustrated in FIG. 3 into the existing chassis of a main HEU in FIG. 2.
Figure 6:
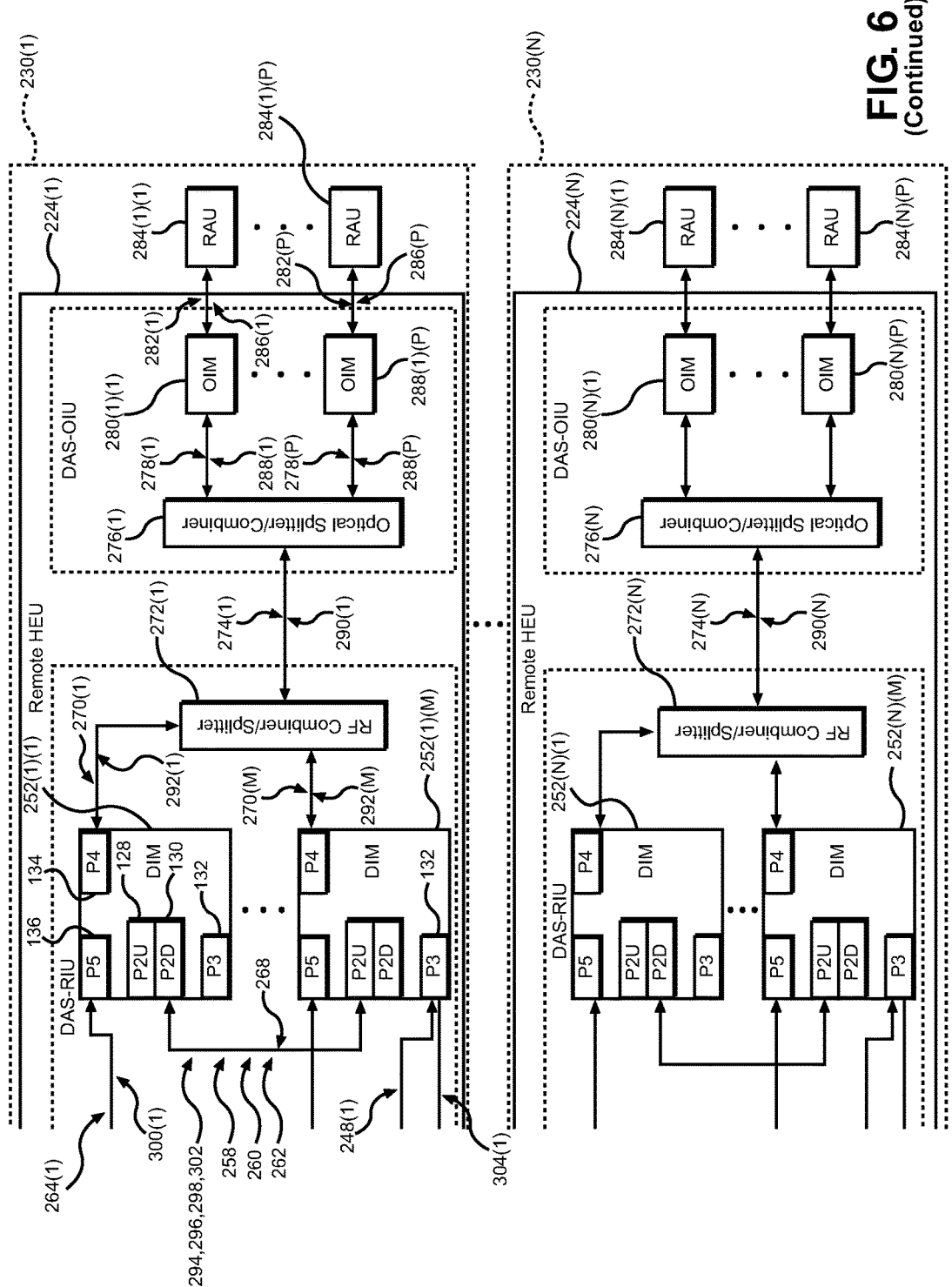

In this regard, FIG. 6 is a schematic diagram of an exemplary optical fiber-based wide-area DAS 220 configured to distribute digital and analog communications signals from a main HEU 222 to one or more remote HEUs 224(1)-224(N) over optical fiber-based digital communications mediums 226(1)-226(N). The main HEU 222 is reconfigured by retrofitting one or more of the DAIMs 120 illustrated FIG. 3 into the existing chassis of the main HEU 38 in FIG. 2. Elements in FIG. 2 are referenced in connection with FIG. 6 and will not be re-described herein. Common elements between FIGS. 3, 4, and 6 are shown therein with common element numbers, thus will not be re-described herein.

With reference to FIG. 6, the optical fiber-based wide-area DAS 220 comprises a main DAS 228 that comprises the main HEU 222. The optical fiber-based wide-area DAS 220 further comprises one or more remote DASs 230(1)-230(N) that comprise the one or more remote HEUs 224(1)-224(N), respectively. The main HEU 222 comprises one or more DAIMs 232(1)-232(N), wherein each of the one or more DAIMs 232(1)-232(N) is same as the DAIM 120. The one or more DAIMs 232(1)-232(N) are configured to distribute digital and analog communications signals to the one or more remote HEUs 224(1)-224(N) over the optical fiber-based digital communications mediums 226(1)-226(N), respectively. The optical fiber-based digital communications mediums 226(1)-226(N) comprise optical fiber-based downlink digital communications mediums 234(1)-234(N) and optical fiber-based uplink digital communications mediums 236(1)-236(N), respectively. Hence, the one or more DAIMs 232(1)-232(N) are configured to distribute digital and analog communications signals to the one or more remote HEUs 224(1)-224(N) over the optical fiber-based downlink digital communications mediums 234(1)-234(N) and the optical fiber-based uplink digital communications mediums 236(1)-236(N), respectively. Further, the one or more DAIMs 232(1)-232(N) are coupled to one or more BTSs 238(1)-238(N) and to one or more BBUs 240(1)-240(N), respectively. In addition, the one or more DAIMs 232(1)-232(N) may also be coupled to one or more RAUs 242(1)-242(N), respectively. For the convenience of discussion, the DAIM 232(1) in the main HEU 222 and the remote HEU 224(1) are described hereinafter as a non-limiting example. Nonetheless, the configuration and operating principles for distributing digital and analog communications signals in the optical fiber-based wide-area DAS 220 are applicable to any of the one or more DAIMs 232(1)-232(N) and any of the one or more remote HEUs 224(1)-224(N).

With continuing reference to FIG. 6, like the DAIM 120, the DAIM 232(1) comprises the analog communications interface 122, the upstream digital bus interface 128, the downstream digital bus interface 130, the at least one digital remote distribution interface 132, the analog local distribution interface 134, and the digital communications interface 136. In a non-limiting example, the analog communications interface 122 and the digital communications interface 136 are coupled to the BTS 238(1) and the BBU 240(1), respectively. The analog local distribution interface 134 may be coupled with the RAU 242(1). The digital remote distribution interface 132 is coupled to the respective optical fiber-based downlink digital communications medium 234(1) via a respective E/O converter 244(1) and is coupled to the respective optical fiber-based uplink digital communications medium 236(1) via a respective O/E converter 246(1). The upstream digital bus interface 128 is coupled to a downstream digital bus interface (a second downstream digital bus interface) (not shown) in a second DAIM (not shown) among the one or more DAIMs 232(1)-232(N) that is logically configured as an upstream DAIM to the DAIM 232(1). The downstream digital bus interface 130 is coupled to an upstream digital bus interface (a third upstream digital bus interface) (not shown) in a third DAIM among the one or more DAIMs 232(1)-232(N) that is logically configured as a downstream DAIM to the DAIM 232(1). The DAIM 232(1) generates a combined downlink digital RF signal 248(1), which is subsequently converted into a combined downlink optical RF signal 250(1) and distributed to the remote HEU 224(1) over the optical fiber-based downlink digital communications medium 234(1).

With continuing reference to FIG. 6, the remote HEU 224(1) comprises one or more remote-HEU DIMs 252(1)(1)-252(1)(M) corresponding to one or more RF bands (not shown), respectively. Each of the one or more remote-HEU DIMs 252(1)(1)-252(1)(M) is same as the DIM 189. In this regard, each of the one or more remote-HEU DIMs 252(1)(1)-252(1)(M) comprises the upstream digital bus interface (remote-DIM upstream digital bus interface) 128, the downstream digital bus interface (remote-DIM downstream digital bus interface) 130, the at least one digital remote distribution interface (at least one remote-DIM digital remote distribution interface) 132, the analog local distribution interface (remote-DIM analog local distribution interface) 134, and the digital communications interface (remote-DIM digital communications interface) 136. At least one remote- HEU DIM among the one or more remote-HEU DIMs 252(1)(1)-252(1)(M) in the remote HEU 224(1) is configured to interface with the DAIM 232(1) in the main HEU 222. For the convenience of discussion, the remote-HEU DIM 252(1)(M) is referenced herein as the at least one remote-HEU DIM configured to interface with the DAIM 232(1) in the main HEU 222 in a non-limiting example.

With continuing reference to FIG. 6, the remote-DIM digital remote distribution interface 132 in the remote-HEU DIM 252(1)(M) is coupled to the optical fiber-based downlink digital communications medium 234(1) via a remote-HEU O/E converter 254(1) and to the optical fiber-based uplink digital communications medium 236(1) via a remote-HEU E/O converter 256(1). The remote-HEU O/E converter 254(1) receives and converts the combined downlink optical RF signal 250(1) back to the combined downlink digital RF signal 248(1). The remote-HEU DIM 252(1)(M) receives the combined downlink digital RF signal 248(1) from the remote-DIM digital remote distribution interface 132 in the remote-HEU DIM 252(1)(M). Subsequently, remote-HEU DIM 252(1)(M) converts the combined downlink digital RF signal 248(1) into one or more first remote-DIM downlink digital RF signals 258 that correspond to the one or more RF bands. The remote-HEU DIM 252(1)(M) then provides the one or more first remote-DIM downlink digital RF signals 258 to the remote-DIM upstream digital bus interface 128 and the remote-DIM downstream digital bus interface 130. The remote-HEU DIM 252(1)(M) may receive one or more second remote-DIM downlink digital RF signals 260 corresponding to the one or more RF bands from the remote-DIM upstream digital bus interface 128. The remote-HEU DIM 252(1)(M) may also receive one or more third remote-DIM downlink digital RF signals 262 corresponding to the one or more RF bands from the remote-DIM downstream digital bus interface 130. The remote-HEU DIM 252(1)(M) is configured to provide the one or more second remote-DIM downlink digital RF signals 260 to the remote-DIM downstream digital bus interface 130. The remote-HEU DIM 252(1)(M) is also configured to provide the one or more third remote-DIM downlink digital RF signals 262 to the remote-DIM upstream digital bus interface 128. The remote-HEU DIM 252(1)(M) may also receive a remote-DAS downlink digital baseband signal 264(M) from a remote-DAS digital signal source 266(1)(M). In a non-limiting example, the remote-DAS digital signal source 266(1)(M) is a BBU. The remote-HEU DIM 252(1)(M) converts the remote-DAS downlink digital baseband signal 264(M) to generate one or more fourth remote-DIM downlink digital RF signals 268 corresponding to the one or more RF bands. The remote-HEU DIM 252(1)(M) provides the one or more fourth remote-DIM downlink digital RF signals 268 to the remote-DIM upstream digital bus interface 128 and the remote-DIM downstream digital bus interface 130.

With continuing reference to FIG. 6, the remote-HEU DIM 252(1)(M) is further configured to combine one or more remote-DIM downlink digital signals (not shown) to generate a remote-DIM combined downlink digital RF signal (not shown), which is then converted into a remote-DIM combined downlink analog RF signal 270(M) by a remote-DIM D/A converter (not shown) in the remote-HEU DIM 252(1)(M). The remote-DIM combined downlink digital RF signal and the remote-DIM combined downlink analog RF signal 270(M) correspond to an RF band associated with the remote-HEU DIM 252(1)(M) among the one or more RF bands supported by the remote HEU 224(1). The remote-DIM combined downlink analog RF signal 270(M) is provided to the remote-DIM analog local distribution interface 134. The one or more remote-DIM downlink digital signals are programmably determined by a remote-DIM digital signal processing controller (not shown) in the remote-HEU DIM 252(1)(M).

With continuing reference to FIG. 6, a remote-HEU RF combiner/splitter 272(1) in the remote HEU 224(1) converts and combines one or more remote-DIM combined downlink analog RF signals 270(1)-270(M) to generate a remote-HEU combined downlink analog RF signal 274(1). An remote-HEU optical splitter/combiner 276(1) then splits the remote-HEU combined downlink analog RF signal 274(1) to generate one or more remote-OIM downlink analog RF signals 278(1)-278(P), which are subsequently received by one or more remote-HEU OIMs 280(1)(1)-280(1)(P). The one or more remote-HEU OIMs 280(1)(1)-280(1)(P) then convert the one or more remote-OIM downlink analog RF signals 278(1)-278(P) into one or more remote-OIM downlink optical RF signals 282(1)-282(P) and provide to the one or more remote-DAS RAUs 284(1)(1)-284(1)(P), respectively.

With continuing reference to FIG. 6, the one or more remote-HEU OIMs 280(1)(1)-280(1)(P) receive one or more remote-OIM uplink optical RF signals 286(1)-286(P). The one or more remote-HEU OIMs 280(1)(1)-280(1)(P) then convert the one or more remote-OIM uplink optical RF signals 286(1)-286(P) into one or more remote-OIM uplink analog RF signals 288(1)-288(P). The remote-HEU optical splitter/combiner 276(1) combines the one or more remote-OIM uplink analog RF signals 288(1)-288(P) to generate a remote-HEU combined uplink analog RF signal 290(1). The remote-HEU RF combiner/splitter 272(1) then splits the remote-HEU combined uplink analog RF signal 290(1) into one or more remote-DIM combined uplink analog RF signals 292(1)-292(M) corresponding to the one or more RF bands, respectively. The one or more remote-DIM combined uplink analog RF signals 292(1)-292(M) are received by the one or more remote-HEU DIMS 252(1)(1)-252(1)(M), respectively. The remote-HEU DIM 252(1)(M) receives the remote-DIM combined uplink analog RF signal 292(M) among the one or more remote-DIM combined uplink analog RF signals 292(1)-292(M). A remote-DIM A/D converter (not shown) inside the remote-HEU DIM 252(1)(M) receives the remote-DIM combined uplink analog RF signal 292(M) from the remote-DIM analog local distribution interface 134 and converts the remote-DIM combined uplink analog RF signal 292(M) into a remote-DIM combined uplink digital RF signal (not shown). The digital signal processing circuit 152 (not shown) in the remote-HEU DIM 252(1)(M) (the remote-DIM digital signal processing circuit) splits the remote-DIM combined uplink digital RF signal into one or more first remote-DIM uplink digital RF signals 294 and provides the one or more first remote-DIM uplink digital RF signals 294 to the remote-DIM upstream digital bus interface 128 and the remote-DIM downstream digital bus interface 130.

With continuing reference to FIG. 6, the remote-HEU DIM 252(1)(M) may receive one or more second remote-DIM uplink digital RF signals 296 and one or more third remote-DIM uplink digital RF signals 298 from the remote-DIM upstream digital bus interface 128 and the remote-DIM downstream digital bus interface 130, respectively. The remote-HEU DIM 252(1)(M) is configured to provide the one or more second remote-DIM uplink digital RF signals 296 to the remote-DIM downstream digital bus interface 130. The remote-HEU DIM 252(1)(M) is also configured to provide the one or more third remote-DIM uplink digital RF signals 298 to the remote-DIM upstream digital bus interface 128. The remote-HEU DIM 252(1)(M) may also receive a remote-DAS uplink digital baseband signal 300 (M) from the remote-DIM digital communications interface 136 that is coupled to the remote-DAS digital signal source 266(1)(M). The remote-HEU DIM 252(1)(M) converts the remote-DAS uplink digital baseband signal 300(M) to generate one or more fourth remote-DIM uplink digital RF signals 302. The remote-HEU DIM 252(1)(M) provides the one or more fourth remote-DIM uplink digital RF signals 302 to the remote-DIM upstream digital bus interface 128 and the remote-DIM downstream digital bus interface 130.

With continuing reference to FIG. 6, the remote-HEU DIM 252(1)(M) combines one or more remote-DIM uplink digital RF signals (not shown) to generate a combined uplink digital RF signal 304(1). The one or more remote-DIM uplink digital RF signals are programmably determined by the remote-DIM digital signal processing controller 156 (not shown) from the one or more first remote-DIM uplink digital RF signals, the one or more second remote-DIM uplink digital signals, the one or more third remote-DIM uplink digital signals, and the one or more fourth remote-DIM uplink digital signals. The combined uplink digital RF signal 304(1) is subsequently converted into a combined uplink optical RF signal 306(1) by the remote-HEU E/O converter 256(1) and distributed to the respective O/E converter 246(1) via the respective optical fiber-based uplink digital communications medium 236(1). The respective O/E converter 246(1) converts the combined uplink optical RF signal 306(1) back to the combined uplink digital RF signal 304(1) and provides to the at least one digital remote distribution interface 132 in the DAIM 232(1).

Figure 7:
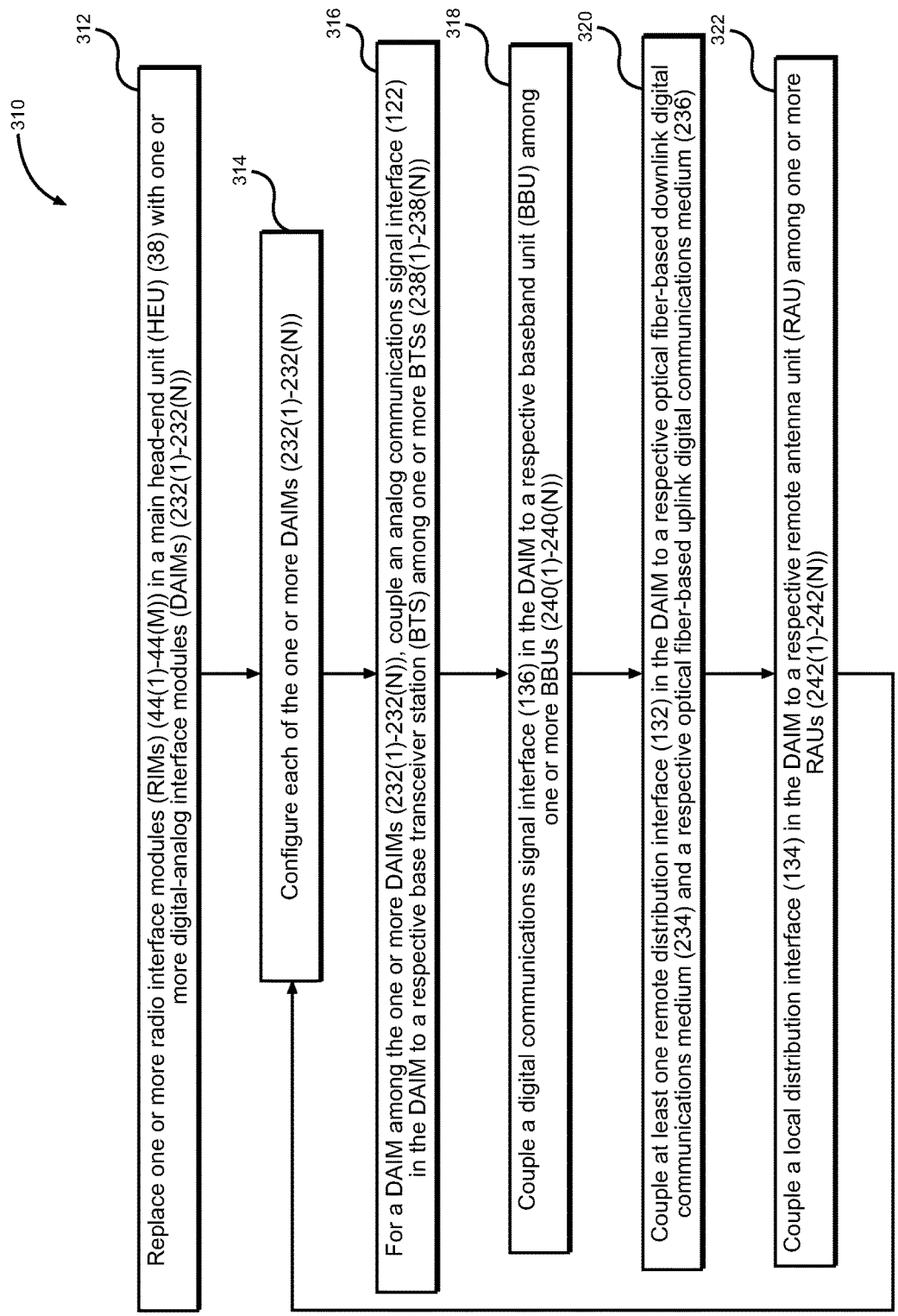
FIG. 7 is a flowchart of an exemplary HEU configuration process reconfiguring the main HEU in FIG. 2 with one or more of the DAIMs in FIG. 6.

FIG. 7 is a flowchart of an exemplary HEU configuration process 310 for reconfiguring the main HEU 38 in FIG. 2 with the one or more DAIMs 231(1)-232(N) in FIG. 6. Elements in FIGS. 2, 3, and 6 are referenced in connection to FIG. 7 and will not be re-described herein.

According to the HEU configuration process 310, the one or more main-HEU RIMs 44(1)-44(M) in the main HEU 38 are replaced with the one or more DAIMs 232(1)-232(N) (block 312). Next, the HEU configuration process 310 configures each of the one or more DAIMs 232(1)-232(N) (block 314). For a DAIM among the one or more DAIMs 232(1)-232(N), an analog communications interface (122) is coupled to a respective BTS among the one or more BTSs 238(1)-238(N) (block 316). Next, a digital communications interface 136 in the DAIM is coupled to a respective BBU among the one or more BBUs 240(1)-240(N) (block 318). Subsequently, at least one digital remote distribution interface 132 in the DAIM is coupled to a respective optical fiber-based downlink digital communications medium 234 and a respective optical fiber-based uplink digital communications medium 236 (block 320). Then, an analog local distribution interface 134 in the DAIM is coupled to a respective RAU among the one or more RAUs 242(1)-242(N) (block 322). To enable interconnections between the one or more DAIMs 232(1)-232(N), a logical upstream DAIM and a logical downstream DAIM are identified for each of the one or more DAIMs 232(1)-232(N). Subsequently for each of the DAIM among the one or more DAIMs 232(1)-232(N), the upstream digital bus interface 128 of the DAIM is coupled to a downstream digital bus 130 of the logical upstream DAIM. Also, the downstream digital bus interface 130 of the DAIM is coupled to an upstream digital bus interface 128 of the logical downstream DAIM.

Figure 8:
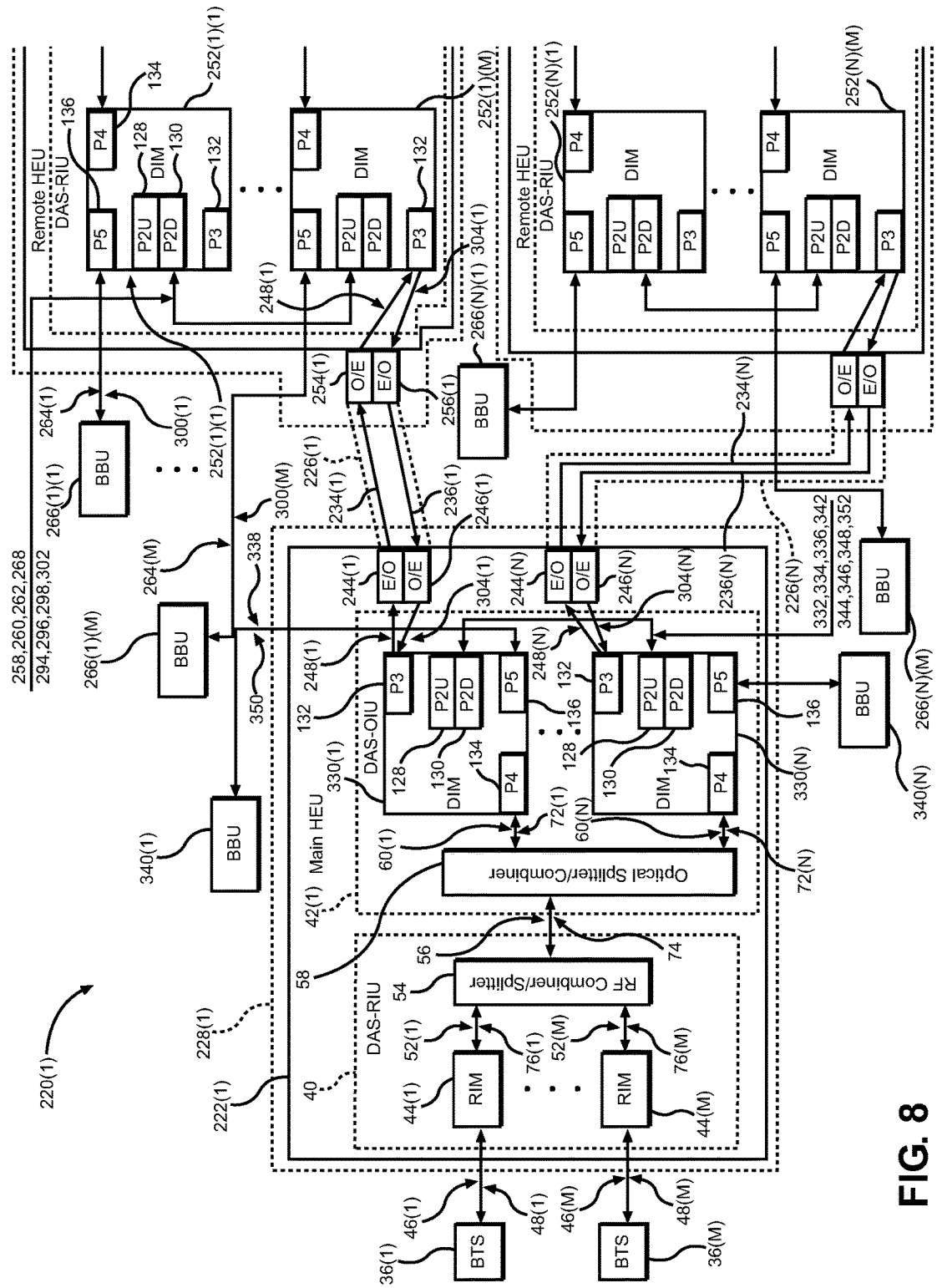
FIG. 8 is a schematic diagram of an exemplary optical fiber-based wide-area DAS configured to distribute digital and analog communications signals from a main HEU to the one or more remote HEUs in FIG. 6 over the optical fiber-based digital communications mediums in FIG. 6, wherein the main HEU is reconfigured by retrofitting one or more of the DIMs illustrated in FIG. 4 into the existing chassis of a main HEU in FIG. 2.
Figure 8:
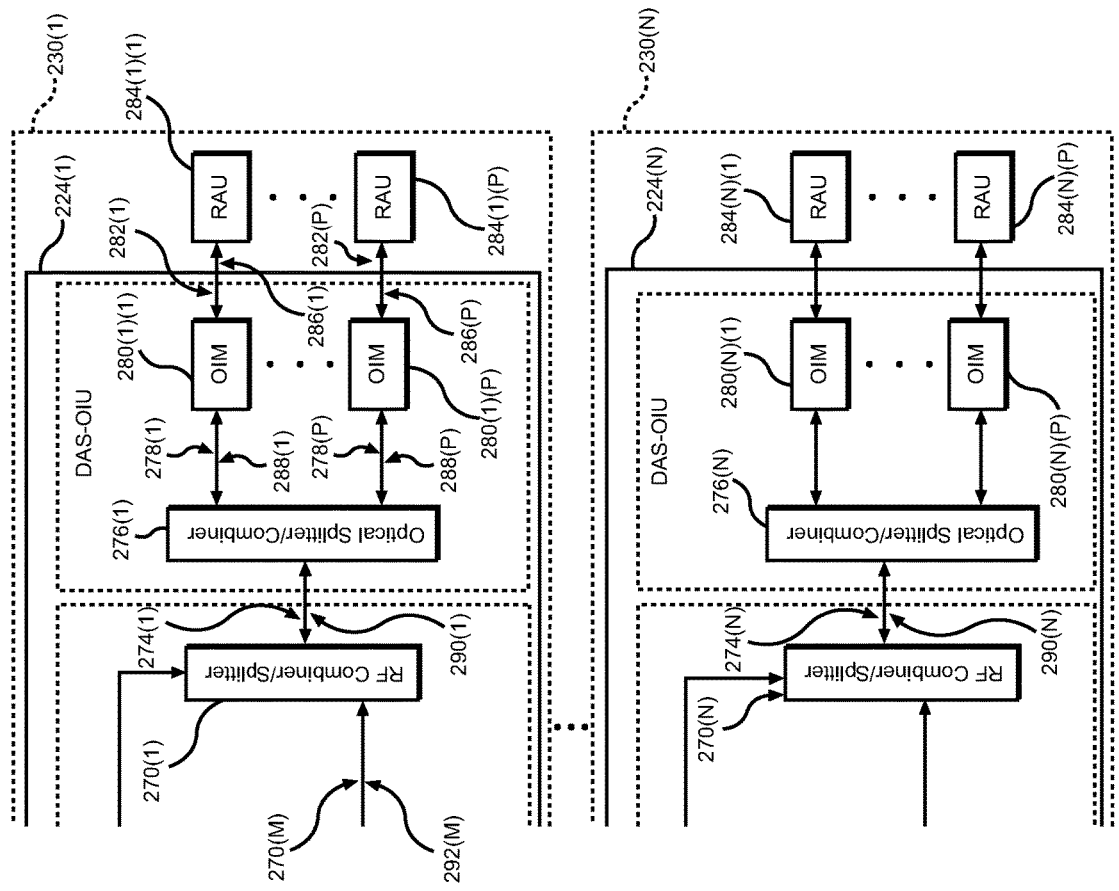

Alternative to retrofitting the one or more DAIMs 120 of FIG. 3 into the existing chassis of the main HEU 38 in FIG. 2, it is also possible to retrofit one or more DIMs 189 of FIG. 4 into the existing chassis of the main-HEU DAS-OIU 42 in FIG. 2 for distributing digital and analog communications signals over optical fiber-based digital communications mediums. In this regard, FIG. 8 is a schematic diagram of an exemplary optical fiber-based wide-area DAS 220(1) configured to distribute digital and analog communications signals from a main HEU 222(1) to the one or more remote HEUs 224(1)-224(N) in FIG. 6 over the optical fiber-based digital communications mediums 226(1)-226(N) in FIG. 6, wherein the main HEU 222(1) is reconfigured by retrofitting one or more of the DIMs 189 illustrated in FIG. 4 into the existing chassis of the main HEU 38 in FIG. 2. Common elements between FIGS. 2, 4, 6, and 8 are shown therein with common element numbers, thus will not be re-described herein.

With reference to FIG. 8, the optical fiber-based wide-area DAS 220(1) comprises a main DAS 228(1) that comprises the main HEU 222(1). The optical fiber-based wide-area DAS 220(1) further comprises the one or more remote DASs 230(1)-230(N) that comprise the one or more remote HEUs 224(1)-224(N), respectively. In the main HEU 222(1), one or more DIMs (main-HEU DIMs) 330(1)-330(N) are retrofit into the chassis of a main-HEU DAS-OIU 42(1). The one or more DIMs 330(1)-330(N) are configured to distribute digital and analog communications signals to the one or more remote HEUs 224(1)-224(N) over the optical fiber-based digital communications mediums 226(1)-226(N), respectively. The optical fiber-based digital communications mediums 226(1)-226(N) comprise the optical fiber-based downlink digital communications mediums 234(1)-234(N) and the optical fiber-based uplink digital communications mediums 236(1)-236(N), respectively. Hence, the one or more main-HEU DIMs 330(1)-330(N) are configured to distribute digital and analog communications signals to the one or more remote HEUs 224(1)-224(N) over the optical fiber-based downlink digital communications mediums 234(1)-234(N) and the optical fiber-based uplink digital communications mediums 236(1)-236(N), respectively. For the convenience of discussion, the main-HEU DIM 330(1) in the main HEU 222(1) and the remote HEU 224(1) are described hereinafter as a non-limiting example. Nonetheless, the configuration and operating principles for distributing digital and analog communications signals in the optical fiber-based wide-area DAS 220(1) are applicable to any of the one or more main-HEU DIMs 330(1)-330(N) and any of the one or more remote HEUs 224(1)-224(N).

With continuing reference to FIG. 8, the main-HEU DIM 330(1) among the one or more main-HEU DIMs 330(1)-330(N) receives the second downlink analog RF signal 60(1) among the plurality of second downlink analog RF signals 60(1)-60(N) from the optical splitter/combiner 58. The second downlink analog RF signal (downlink analog RF signal) 60(1) is received by the main-HEU DIM 330(1) via the analog local distribution interface 134. The A/D converter 148 (not shown) in the main-HEU DIM 330(1) converts the second downlink analog RF signal 60(1) to generate a downlink digital RF signal 150 (not shown). The digital signal processing circuit 152 (not shown) in the main-HEU DIM 330(1) receives and converts the downlink digital RF signal 150 to generate one or more first downlink digital RF signals 332. The main-HEU DIM 330(1) then provides the one or more first downlink digital RF signals 332 to the upstream digital bus interface 128 and the downstream digital bus interface 130 for sharing the one or more first downlink digital RF signals 332 with the rest of main-HEU DIMs 330(1)-330(N) in the main HEU 222(1). The digital signal processing circuit 152 in the main-HEU DIM 330(1) may also receive one or more second downlink digital RF signals 334 from the upstream digital bus interface 128 and one or more third downlink digital RF signals 336 from the downstream digital bus interface 130. In turn, the digital signal processing circuit 152 in the main-HEU DIM 330(1) provides the one or more second downlink digital RF signals 334 to the downstream digital bus interface 130 and provides the one or more third downlink digital RF signals 336 to the upstream digital bus interface 128. The one or more main-HEU DIMs 330(1)-330(N) may be coupled to one or more BBUs 340(1)-340(N), respectively. In this regard, the digital signal processing circuit 152 in the main-HEU DIM 330(1) may also receive a downlink digital baseband signal 338 from the digital communications interface 136, which is coupled to the BBU 340(1). In a non-limiting example, the downlink digital baseband signal 338 is in conformance with the CPRI format. The digital signal processing circuit 152 in the main-HEU DIM 330(1) converts the downlink digital baseband signal 338 to generate one or more fourth downlink digital RF signals 342. Again, the digital signal processing circuit 152 in the main-HEU DIM 330(1) provides the one or more fourth downlink digital RF signals 342 to the upstream digital bus interface 128 and the downstream digital bus interface 130.

With continuing reference to FIG. 8, the digital signal processing circuit 152 in the main-HEU DIM 330(1) combines one or more respective first downlink digital RF signals (not shown), one or more respective second downlink digital RF signals (not shown), one or more respective third downlink digital RF signals (not shown), and one or more respective fourth downlink digital RF signals (not shown) into the combined downlink digital RF signal 248(1). The one or more respective first downlink digital RF signals are programmably determined by the digital signal processing controller 156 (not shown) among the one or more first downlink digital RF signals 332. The one or more respective second downlink digital RF signals are programmably determined by the digital signal processing controller 156 among the one or more second downlink digital RF signals 334. The one or more respective third downlink digital RF signals are programmably determined by the digital signal processing controller 156 among the one or more third downlink digital RF signals 336. The one or more respective fourth downlink digital RF signals are programmably determined by the digital signal processing controller 156 among the one or more fourth downlink digital RF signals 342. The combined downlink digital RF signal 248(1) is then provided to the respective E/O converter 244(1) for distribution to the remote HEU 224(1). The signal processing performed by the remote HEU 224(1) has been described previously in reference to FIG. 6 and will not be re-described herein.

With continuing reference to FIG. 8, the digital signal processing circuit 152 in the main-HEU DIM 330(1) receives the combined uplink digital RF signal 304(1) from the remote HEU 224(1) via the respective O/E converter 246(1) that is coupled to the at least one digital remote distribution interface 136. The digital signal processing circuit 152 in the main-HEU DIM 330(1) splits the combined uplink digital RF signal 304(1) to generate one or more first uplink digital RF signals 344. The main-HEU DIM 330(1) then provides the one or more first uplink digital RF signals 344 to the upstream digital bus interface 128 and the downstream digital bus interface 130 for sharing the one or more first uplink digital RF signals 344 with the rest of main-HEU DIMs 330(1)-330(N) in the main HEU 222(1). The digital signal processing circuit 152 in the main-HEU DIM 330(1) may also receive one or more second uplink digital RF signals 346 from the upstream digital bus interface 128 and one or more third uplink digital RF signals 348 from the downstream digital bus interface 130. In turn, the digital signal processing circuit 152 in the main-HEU DIM 330(1) provides the one or more second uplink digital RF signals 346 to the downstream digital bus interface 130 and provides the one or more third uplink digital RF signals 348 to the upstream digital bus interface 128. The digital signal processing circuit 152 in the main-HEU DIM 330(1) may also receive an uplink digital baseband signal 350 from the digital communications interface 136, which is coupled to the BBU 340(1). In a non-limiting example, the uplink digital baseband signal 350 is in conformance with the CPRI format. The digital signal processing circuit 152 in the main-HEU DIM 330(1) converts the uplink digital baseband signal 350 to generate one or more fourth uplink digital RF signals 352. Again, the digital signal processing circuit 152 in the main-HEU DIM 330(1) provides the one or more fourth uplink digital RF signals 352 to the upstream digital bus interface 128 and the downstream digital bus interface 130.

With continuing reference to FIG. 8, the digital signal processing circuit 152 in the main-HEU DIM 330(1) combines one or more respective first uplink digital RF signals (not shown), one or more respective second uplink digital RF signals (not shown), one or more respective third uplink digital RF signals (not shown), and one or more respective fourth uplink digital RF signals (not shown) into the second uplink digital RF signal (the uplink digital RF signal) 72(1). The one or more respective first uplink digital RF signals are programmably determined by the digital signal processing controller 156 among the one or more first uplink digital RF signals 344. The one or more respective second uplink digital RF signals are programmably determined by the digital signal processing controller 156 among the one or more second uplink digital RF signals 346. The one or more respective third uplink digital RF signals are programmably determined by the digital signal processing controller 156 among the one or more third uplink digital RF signals 348. The one or more respective fourth uplink digital RF signals are programmably determined by the digital signal processing controller 156 among the one or more fourth uplink digital RF signals 352. The second uplink digital RF signal 74 is then provided to the optical splitter/combiner 58.

Figure 9:
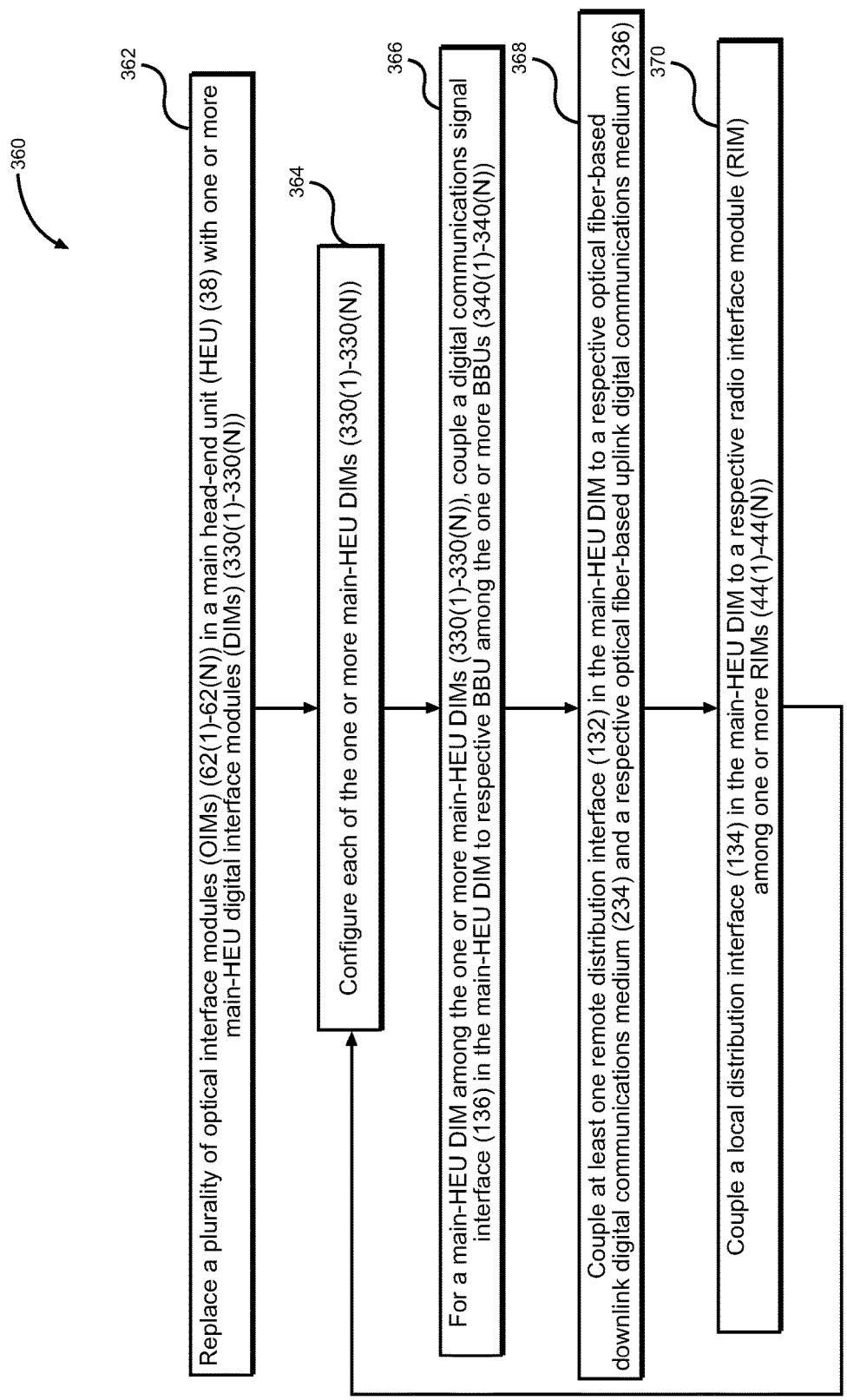
FIG. 9 is a flowchart of an exemplary HEU configuration process reconfiguring the main HEU in FIG. 2 with one or more main-HEU DIMs in FIG. 8.

FIG. 9 is a flowchart of an exemplary HEU configuration process 360 for reconfiguring the main HEU 38 in FIG. 2 with the one or more main-HEU DIMs 330(1)-330(N) in FIG. 8. Elements in FIGS. 2, 3, 6, and 8 are referenced in connection to FIG. 9 and will not be re-described herein.

According to the HEU configuration process 360, the plurality of OIMs 62(1)-62(N) in the main HEU 38 are replaced with the one or more main-HEU DIMs 330(1)-330(N) (block 362). Next, the HEU configuration process 310 configures each of the one or more main-HEU DIMs 330(1)-330(N) (block 364). For a main-HEU DIM among the one or more main-HEU DIMs 330(1)-330(N), a digital communications interface 136 in the main-HEU DIM is coupled to a respective BBU among the one or more BBUs 340(1)-340(N) (block 366). Subsequently, at least one digital remote distribution interface 132 in the main-HEU DIM is coupled to a respective optical fiber-based downlink digital communications medium 234 and a respective optical fiber-based uplink digital communications medium 236 (block 368). Then, an analog local distribution interface 134 in the main-HEU DIM is coupled to a respective RIM among the one or more main-HEU RIMs 44(1)-44(N) (block 370). To enable interconnections between the one or more main-HEU DIMs 330(1)-330(N), a logical upstream main-HEU DIM and a logical downstream main-HEU DIM are identified for each of the one or more main-HEU DIMs 330(1)-330(N). Subsequently for each of the main-HEU DIM among the one or more main-HEU DIMs 330(1)-330(N), the upstream digital bus interface 128 of the main-HEU DIM is coupled to a downstream digital bus 130 of the logical upstream main-HEU DIM. Also, the downstream digital bus interface 130 of the main-HEU DIM is coupled to an upstream digital bus interface 128 of the logical downstream main-HEU DIM.

As previously discussed in references to FIGS. 6 and 8, the combined downlink digital RF signal 248(1) comprises the one or more respective first downlink digital RF signals, the one or more respective second downlink digital RF signals, the one or more respective third downlink digital RF signals, and the one or more respective fourth downlink digital RF signals. Likewise, the combined uplink digital RF signal 304(1) comprises the one or more respective first uplink digital RF signals, the one or more respective second uplink digital RF signals, the one or more respective third uplink digital RF signals, and the one or more respective fourth uplink digital RF signals. As such, the optical fiber-based downlink digital communications mediums 234(1) and the optical fiber-based uplink digital communications mediums 236(1) are required to provide larger bandwidth, thus increasing complexities and costs of the respective E/O converters 244(1), the respective O/E converters 246(1), the remote-HEU O/E converter 254(1), and the remote-HEU E/O converter 256(1). In this regard, FIG. 10 is a schematic diagram of an exemplary DAS 380 comprising a main HEU 382 coupled to a remote HEU 384 over a plurality of respective optical fiber-based downlink communications mediums 386(1)-386(Q) and a plurality of respective optical fiber-based uplink communications mediums 387(1)-387(Q).

Figure 10:
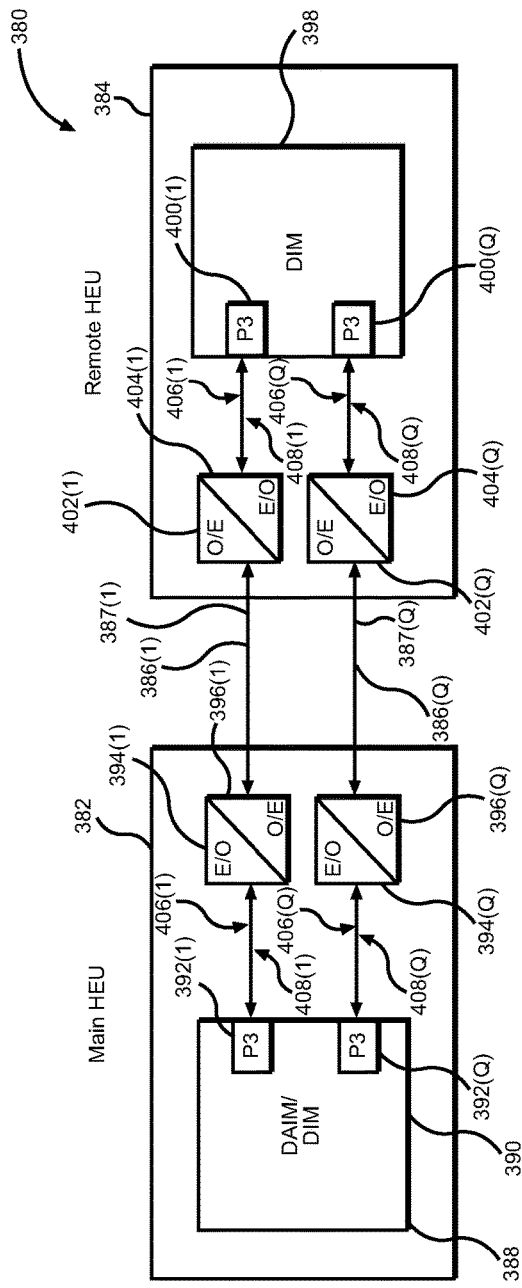
FIG. 10 is a schematic diagram of an exemplary DAS comprising a main HEU coupled to a remote HEU over a plurality of optical fiber-based communications mediums.

With reference to FIG. 10, the main HEU 382 comprises a DAIM 388 or a DIM 390. The DAIM 388 or the DIM 390 comprises a plurality of digital remote distribution interfaces 392(1)-392(Q) that are coupled to a plurality of main-HEU E/O converters 394(1)-394(Q) and a plurality of main-HEU O/E converters 396(1)-396(Q), respectively. The remote HEU 384 comprises a remote-HEU DIM 398. The remote-HEU DIM 398 comprises a plurality of remote-DIM digital remote distribution interfaces 400(1)-400(Q). The plurality of remote-DIM digital remote distribution interfaces 400(1)-400(Q) are coupled to a plurality of remote-HEU O/E converters 402(1)-402(Q) and a plurality of remote-HEU E/O converters 404(1)-404(Q), respectively. The plurality of main-HEU E/O converters 394(1)-394(Q) is coupled to the plurality of remote-HEU O/E converters 402(1)-402(Q) over the plurality of respective optical fiber-based downlink communications mediums 386(1)-386(Q), respectively. The plurality of main-HEU O/E converters 396(1)-396(Q) is coupled to the plurality of remote-HEU E/O converters 404(1)-404(Q) over the plurality of respective optical fiber-based uplink communications mediums 387(1)-387(Q), respectively.

With continuing reference to FIG. 10, a digital signal processing circuit (not shown) in the DAIM 388 or the DIM 390 splits a combined downlink digital RF signal (not shown) into a plurality of bandwidth-reduced combined downlink digital RF signals 406(1)-406(Q). The plurality of bandwidth-reduced combined downlink digital RF signals 406(1)-406(Q) is distributed to the remote HEU 384 via the plurality of digital remote distribution interfaces 392(1)-392(Q). Similarly, a digital signal processing circuit (not shown) in the remote-HEU DIM 398 splits a combined uplink digital RF signal (not shown) into a plurality of bandwidth-reduced combined uplink digital RF signals 408(1)-408(Q). The plurality of bandwidth-reduced combined uplink digital RF signals 408(1)-408(Q) is distributed to the main HEU 382 via the plurality of remote-DIM digital remote distribution interfaces 400(1)-400(Q).

Figure 11:
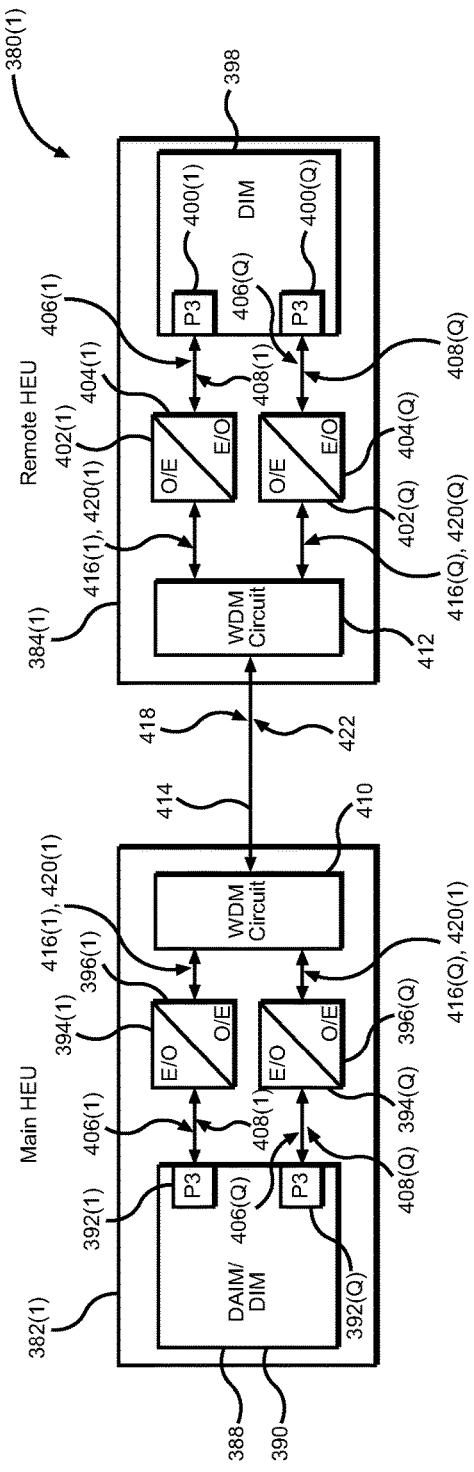
FIG. 11 is a schematic diagram of an exemplary DAS comprising a main HEU coupled to a remote HEU using wavelength-division multiplexing (WDM)

By providing the plurality of digital remote distribution interfaces 392(1)-392(Q) in the main HEU 382 and the plurality of remote-DIM digital remote distribution interfaces 400(1)-400(Q) in the remote HEU 384, it is possible to provide the plurality of main-HEU E/O converters 394(1)-394(Q), the plurality of main-HEU O/E converters 396(1)-396(Q), the plurality of remote-HEU O/E converters 402(1)-402(Q), and the plurality of remote-HEU E/O converters 404(1)-404(Q) with reduced complexities and costs. However, it may be desirable to combine the plurality of optical fiber-based communications mediums 386(1)-386(Q) into a single optical fiber-based communications medium to achieve further cost savings. In this regard, FIG. 11 is a schematic diagram of an exemplary DAS 380(1) comprising a main HEU 382(1) coupled to a remote HEU 384(1) using wavelength-division multiplexing (WDM). Common elements between FIGS. 10 and 11 are shown therein with common element numbers, thus will not be re-described herein.

With reference to FIG. 11, the main HEU 382(1) comprises a main-HEU WDM circuit 410 that is coupled to a remote-HEU WDM circuit 412 comprised in the remote HEU 384(1) over an optical fiber-based digital communications medium 414. In the main HEU 382(1), the plurality of main-HEU E/O converters 394(1)-394(Q) converts the plurality of bandwidth-reduced combined downlink digital RF signals 406(1)-406(Q) into a plurality of bandwidth-reduced combined downlink optical RF signals 416(1)-416(Q). The main-HEU WDM circuit 410 wavelength multiplexes the plurality of bandwidth-reduced combined downlink optical RF signals 416(1)-416(Q) to generate a combined downlink optical RF signal 418. The remote-HEU WDM circuit 412 in turn wavelength de-multiplexes the combined downlink optical RF signal 418 back into the plurality of bandwidth-reduced combined downlink optical RF signals 416(1)-416(Q). The plurality of remote-HEU O/E converters 402(1)-402(Q) subsequently convert the plurality of bandwidth-reduced combined downlink optical RF signals 416(1)-416(Q) into the plurality of bandwidth-reduced combined downlink digital RF signals 406(1)-406(Q).

With continuing reference to FIG. 11, in the remote HEU 384(1), the plurality of remote-HEU E/O converters 404(1)-404(Q) converts the plurality of bandwidth-reduced combined uplink digital RF signals 408(1)-408(Q) into a plurality of bandwidth-reduced combined uplink optical RF signals 420(1)-420(Q). The remote-HEU WDM circuit 412 wavelength multiplexes the plurality of bandwidth-reduced combined uplink optical RF signals 420(1)-420(Q) to generate a combined uplink optical RF signal 422. The main-HEU WDM circuit 410 in turn wavelength de-multiplexes the combined uplink optical RF signal 422 back into the plurality of bandwidth-reduced combined uplink optical RF signals 420(1)-420(Q). The plurality of main-HEU O/E converters 396(1)-396(Q) subsequently converts the plurality of bandwidth-reduced combined uplink optical RF signals 420(1)-420(Q) into the plurality of bandwidth-reduced combined uplink digital RF signals 408(1)-408(Q).

Figure 12:
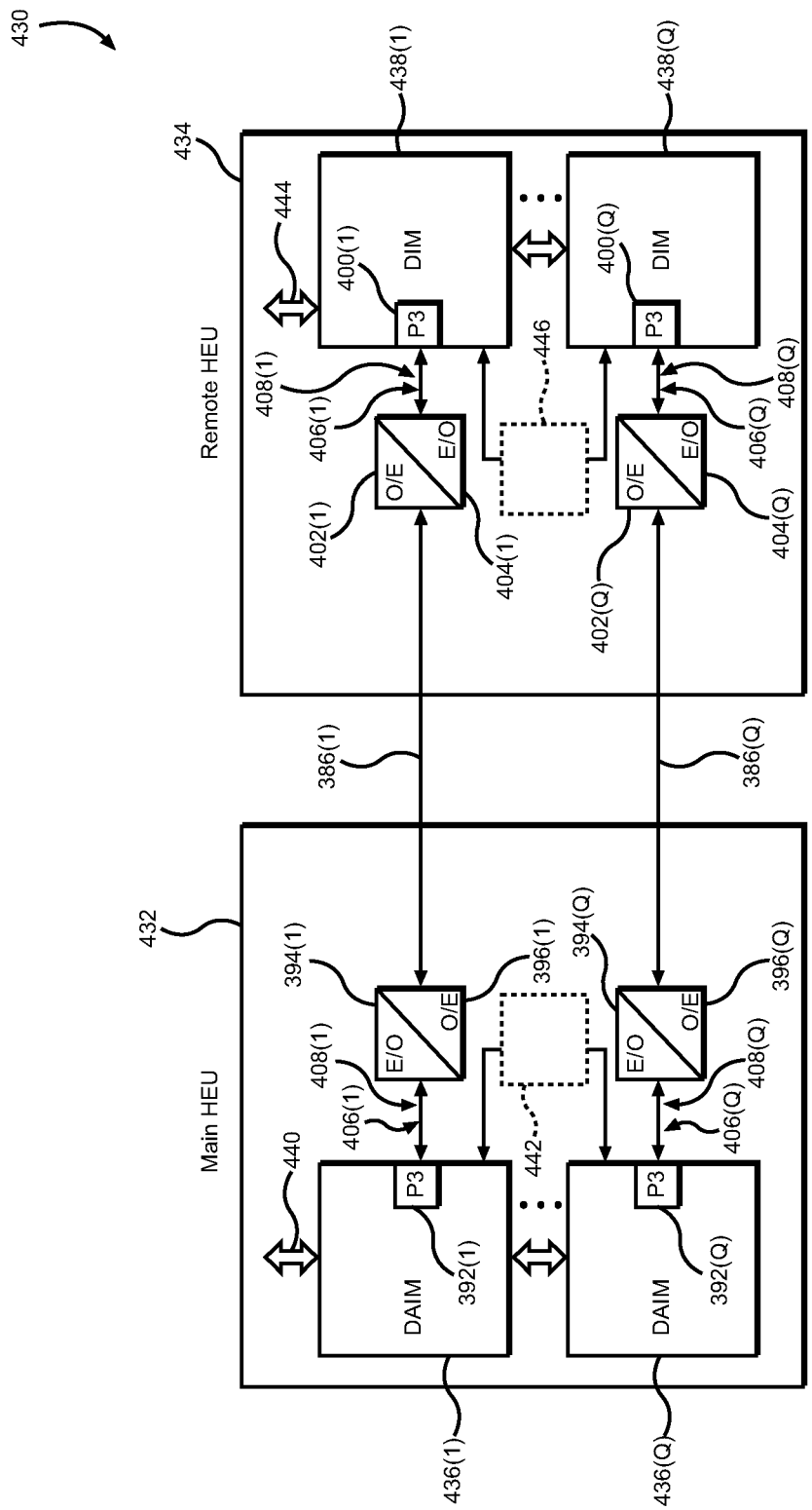
FIG. 12 is a schematic diagram of an exemplary DAS wherein a main HEU and a remote HEU are configured to concurrently distribute digital and/or analog communications signals using a plurality of DAIMs and a plurality of DIMs.

Alternative to adding the plurality of digital remote distribution interfaces 392(1)-392(Q) in the DAIM 388 or the DIM 390 and the plurality of remote-DIM digital remote distribution interfaces 400(1)-400(Q) in the remote-HEU DIM 398 in FIG. 10, it is also possible to utilize multiple DAIMs and/or DIMs for digital and/or analog communications signals distribution between a main HEU and a remote HEU. In this regard, FIG. 12 is a schematic diagram of an exemplary DAS 430 wherein a main HEU 432 and a remote HEU 434 are configured to concurrently distribute digital and/or analog communications signals multiple using a plurality of DAIMs 436(1)-436(Q) and a plurality of DIMs 438(1)-438(Q). Common elements between FIGS. 10 and 12 are shown therein with common element numbers, thus will not be re-described herein.

With reference to FIG. 12, a main-HEU load-sharing bus 440 interconnects the plurality of DAIMs 436(1)-436(Q). A main-HEU load-sharing controller 442, which may be incorporated into the plurality of DAIMs 436(1)-436(Q) for example, is configured to implement load sharing among the plurality of bandwidth-reduced combined downlink digital RF signals 406(1)-406(Q). In the remote HEU 434, a remote-HEU load-sharing bus 444 interconnects the plurality of DIMs 438(1)-438(Q). A remote-HEU load-sharing controller 446, which may be incorporated into the plurality of DIMs 438(1)-438(Q) for example, is configured to implement load sharing among the plurality of bandwidth-reduced combined uplink digital RF signals 408(1)-408(Q).

Figure 13:
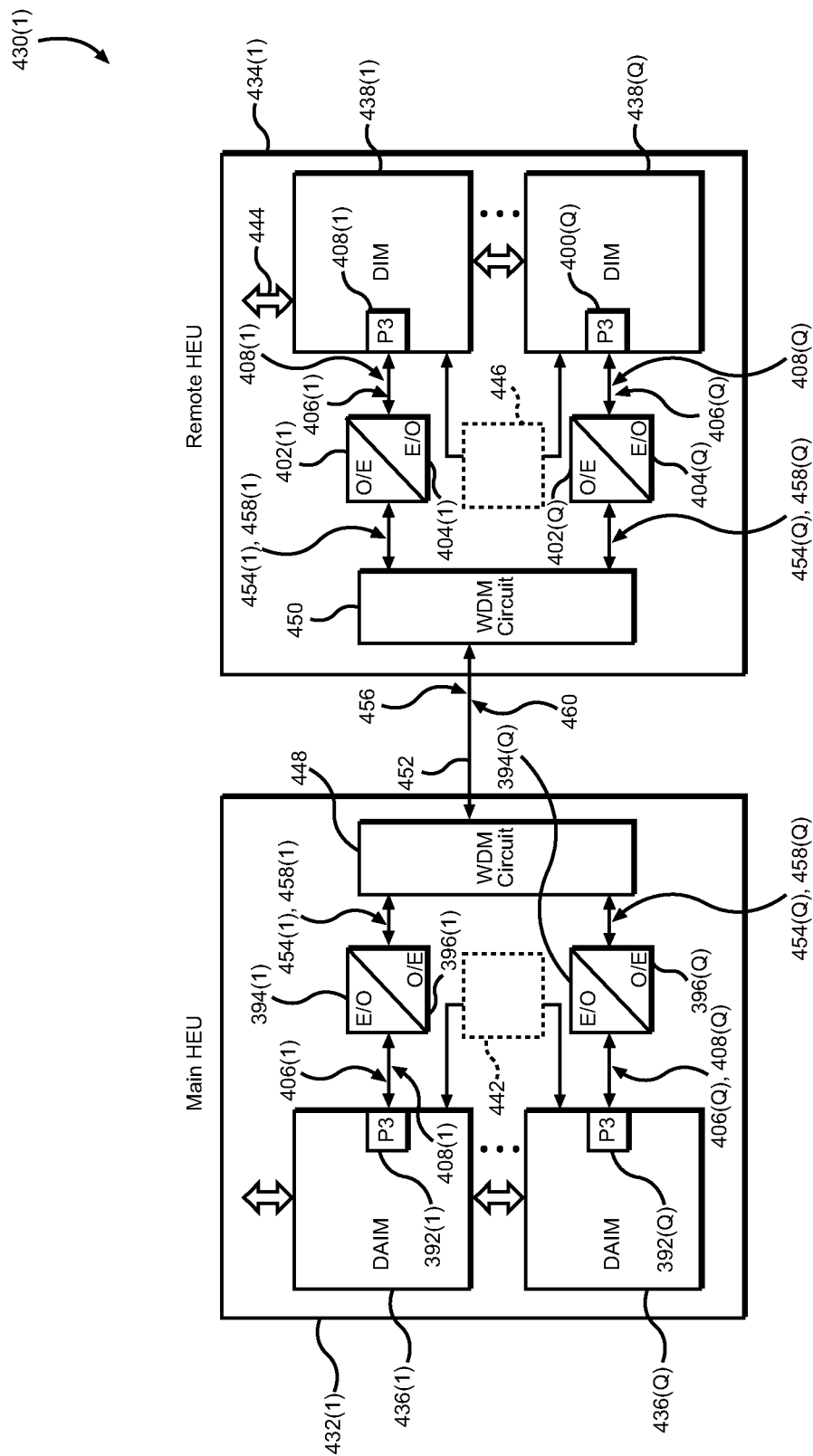
FIG. 13 is a schematic diagram of an exemplary DAS wherein a main HEU and a remote HEU are configured to concurrently distribute digital and/or analog communications signals using WDM.

Alternative to employing the plurality of optical fiber-based communications mediums 386(1)-386(Q) between the main HEU 432 and the remote HEU 434, it may be desirable to combine the plurality of optical fiber-based communications mediums 386(1)-386(Q) into a single optical fiber-based communications medium to achieve further cost savings. In this regard, FIG. 13 is a schematic diagram of an exemplary DAS 430(1) wherein a main HEU 432(1) and a remote HEU 434(1) are configured to concurrently distribute digital and/or analog communications signals multiple using WDM. Common elements between FIGS. 12 and 13 are shown therein with common element numbers, thus will not be re-described herein.

With reference to FIG. 13, the main HEU 432(1) comprises a main-HEU WDM circuit 448 that is coupled to a remote-HEU WDM circuit 450 comprised in the remote HEU 384(1) over an optical fiber-based digital communications medium 452. In the main HEU 432(1), the plurality of main-HEU E/O converters 394(1)-394(Q) converts the plurality of bandwidth-reduced combined downlink digital RF signals 406(1)-406(Q) into a plurality of bandwidth-reduced combined downlink optical RF signals 454(1)-454(Q). The main-HEU WDM circuit 448 wavelength multiplexes the plurality of bandwidth-reduced combined downlink optical RF signals 454(1)-454(Q) to generate a combined downlink optical RF signal 456. The remote-HEU WDM circuit 450 in turn wavelength de-multiplexes the combined downlink optical RF signal 456 back into the plurality of bandwidth-reduced combined downlink optical RF signals 454(1)-454(Q). The plurality of remote-HEU O/E converters 402(1)-402(Q) subsequently converts the plurality of bandwidth-reduced combined downlink optical RF signals 454(1)-454(Q) into the plurality of bandwidth-reduced combined downlink digital RF signals 406(1)-406 (Q).

With continuing reference to FIG. 11, in the remote HEU 434(1), the plurality of remote-HEU E/O converters 404(1)-404(Q) converts the plurality of bandwidth-reduced combined uplink digital RF signals 408(1)-408(Q) into a plurality of bandwidth-reduced combined uplink optical RF signals 458(1)-458(Q). The remote-HEU WDM circuit 450 wavelength multiplexes the plurality of bandwidth-reduced combined uplink optical RF signals 458(1)-458(Q) to generate a combined uplink optical RF signal 460. The main-HEU WDM circuit 448 in turn wavelength de-multiplexes the combined uplink optical RF signal 460 back into the plurality of bandwidth-reduced combined uplink optical RF signals 458(1)-458(Q). The plurality of main-HEU O/E converters 396(1)-396(Q) subsequently converts the plurality of bandwidth-reduced combined uplink optical RF signals 458(1)-458(Q) into the plurality of bandwidth-reduced combined uplink digital RF signals 408(1)-408(Q).

Figure 14:
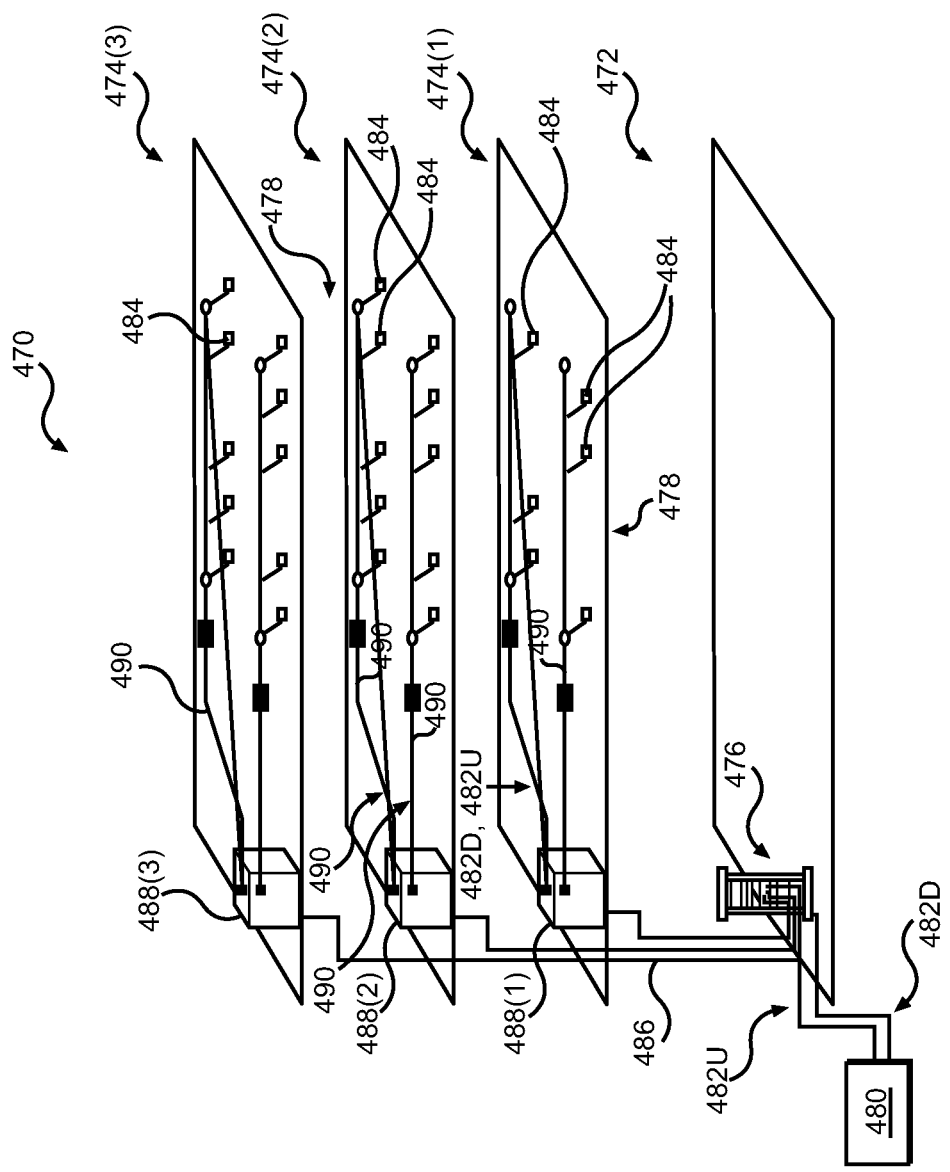
FIG. 14 is a partially schematic cut-away diagram of an exemplary building infrastructure in which an analog DAS, which can include the DAIM in FIG. 3 or the DIM in FIG. 4 to support the distribution of digital and/or communications signals, can be employed.

The DAIM 120 in FIG. 3 or the DIM 189 in FIG. 4 may be provided in an analog DAS 470 in an indoor environment, as illustrated in FIG. 14. FIG. 14 is a partially schematic cut-away diagram of an exemplary building infrastructure in which the analog DAS 470, which can include the DAIM 120 in FIG. 3 or the DIM 189 in FIG. 4 to support the distribution of digital and/or communications signals, can be employed. The building infrastructure 472 in this embodiment includes a first (ground) floor 474(1), a second floor 474(2), and a third floor 474(3). The floors 474(1)-474 (3) are serviced by a central unit 476, which may include the DAIM 120 in FIG. 3 or the DIM 189 in FIG. 4, to provide antenna coverage areas 478 in the building infrastructure 470. The central unit 476 is communicatively coupled to a base station 480 to receive downlink communications signals 482D from the base station 480. The central unit 476 is communicatively coupled to remote antenna units 484 to receive uplink communications signals 482U from the remote antenna units 484, as previously discussed above. The downlink and uplink communications signals 482D, 482U communicated between the central unit 476 and the remote antenna units 484 are carried over a riser cable 486. The riser cable 486 may be routed through interconnect units (ICUs) 488(1)-488(3) dedicated to each of the floors 474 (1)-474(3) that route the downlink and uplink communications signals 482D, 482U to the remote antenna units 484 and also provide power to the remote antenna units 484 via array cables 490.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A digital-analog interface module (DAIM) in a main distributed antenna system (DAS) to support a wide-area DAS, comprising:
  an analog communications interface configured to receive a downlink analog communications signal from at least one of an analog signal source and a baseband signal source;
  at least one digital remote distribution interface to be coupled with a remote DAS component in a remote DAS in the wide-area DAS;

an analog local distribution interface configured to distribute a downlink analog radio frequency (RF) signal to a remote antenna unit (RAU) in the main DAS;

an RF conditioning circuit coupled to the analog communications interface and the analog local distribution interface, the RF conditioning circuit is configured to:

receive the downlink analog communications signal from the analog signal source;

convert the downlink analog communications signal into the downlink analog RF signal adapted for distribution in the wide-area DAS;

provide the downlink analog RF signal to the analog local distribution interface; and provide the downlink analog RF signal to an analog-to-digital (A/D) converter;

the A/D converter coupled to the RF conditioning circuit, wherein the A/D converter is configured to convert the downlink analog RF signal to generate a downlink digital RF signal;

a digital signal processing circuit coupled to the A/D converters and the at least one digital remote distribution interface;

wherein the digital signal processing circuit is configured to:

receive the downlink digital RF signal from the A/D converter;

convert the downlink digital RF signal to generate one or more first downlink digital RF signals;

combine one or more respective first downlink digital RF signals to generate a combined downlink digital RF signal; and provide the combined downlink digital RF signal to the at least one digital remote distribution interface to be distributed to the remote DAS component;

a digital communications interface coupled to the digital signal processing circuit, the digital communications interface is configured to receive a downlink digital baseband signal from a digital signal source; and a digital signal processing controller communicatively coupled to the digital signal processing circuit, the digital signal processing controller is configured to programmably determine the one or more respective first downlink digital RF signals among the one or more first downlink digital RF signals to be combined into the combined downlink digital RF signal.

2. The DAIM of claim 1, wherein the downlink digital baseband signal is configured to be in compliance with a common public radio interface (CPRI) format.

3. The DAIM of claim 1, further comprising:

a digital bus interface comprising:

an upstream digital bus interface coupled to the digital signal processing circuit and is configured to be coupled with a second downstream digital bus interface comprised in a second DAIM that is logically configured as an upstream DAIM to the DAIM; and a downstream digital bus interface coupled to the digital signal processing circuit and is configured to be coupled with a third upstream digital bus interface comprised in a third DAIM that is logically configured as a downstream DAIM to the DAIM.

4. The DAIM of claim 3, wherein the digital signal processing circuit is further configured to:

provide the one or more first downlink digital RF signals to the downstream digital bus interface;

provide the one or more first downlink digital RF signals to the upstream digital bus interface;

receive one or more second downlink digital RF signals from the upstream digital bus interface;

provide the one or more second downlink digital RF signals to the downstream digital bus interface;

receive one or more third downlink digital RF signals from the downstream digital bus interface;

provide the one or more third downlink digital RF signals to the upstream digital bus interface; and combine one or more respective second downlink digital RF signals and one or more respective third downlink digital RF signals to the combined downlink digital RF signal, wherein the one or more respective second downlink digital RF signals and the one or more respective third downlink digital RF signals are programmably determined by the digital signal processing controller among the one or more second downlink digital RF signals and the one or more third downlink digital RF signals, respectively.

5. The DAIM of claim 3, wherein the digital signal processing circuit is further configured to:

convert the downlink digital baseband signal to generate one or more fourth downlink digital RF signals;

provide the one or more fourth downlink digital RF signals to the downstream digital bus interface;

provide the one or more fourth downlink digital RF signals to the upstream digital bus interface; and combine one or more respective fourth downlink digital RF signals to generate the combined downlink digital RF signal, wherein the one or more respective fourth downlink digital RF signals are programmably determined by the digital signal processing controller among the one or more fourth downlink digital RF signals.

6. The DAIM of claim 3, wherein the digital signal processing circuit is further configured to:

receive a combined uplink digital RF signal from the remote DAS component via the at least one digital remote distribution interface;

split the combined uplink digital RF signal to generate one or more first uplink digital RF signals;

provide the one or more first uplink digital RF signals to the downstream digital bus interface;

provide the one or more first uplink digital RF signals to the upstream digital bus interface; and combine one or more respective first uplink digital RF signals to generate an uplink digital RF signal, wherein the one or more respective first uplink digital RF signals are programmably determined by the digital signal processing controller among the one or more first uplink digital RF signals.

7. The DAIM of claim 6, wherein the digital signal processing circuit is further configured to:

receive one or more second uplink digital RF signals from the upstream digital bus interface;

provide the one or more second uplink digital RF signals to the downstream digital bus interface;

receive one or more third uplink digital RF signals from the downstream digital bus interface;

provide the one or more third uplink digital RF signals to the upstream digital bus interface; and combine one or more respective second uplink digital RF signals and one or more respective third uplink digital RF signals to the uplink digital RF signal, wherein the one or more respective second uplink digital RF signals and the one or more respective third uplink digital RF signals are programmably determined by the digital signal processing controller among the one or more second uplink digital RF signals and the one or more third uplink digital RF signals, respectively.

8. The DAIM of claim 6, wherein the digital signal processing circuit is further configured to:
receive an uplink digital baseband signal from the digital signal source via the digital communications interface;
convert the uplink digital baseband signal to generate one or more fourth uplink digital RF signals;
provide the one or more fourth uplink digital RF signals to the downstream digital bus interface;
provide the one or more fourth uplink digital RF signals to the upstream digital bus interface; and
combine one or more respective fourth uplink digital RF signals to generate the uplink digital RF signal, wherein the one or more respective fourth uplink digital RF signals are programmably determined by the digital signal processing controller among the one or more fourth uplink digital RF signals.

9. The DAIM of claim 8, wherein the uplink digital baseband signal is configured to be in compliance with a common public radio interface (CPRI) format.

10. The DAIM of claim 6, further comprising a digital-to-analog (D/A) converter coupled to the RF conditioning circuit and the digital signal processing circuit, wherein the D/A converter is configured to convert the uplink digital RF signal to generate an uplink analog RF signal.

11. The DAIM of claim 10, wherein the RF conditioning circuit is further configured to:
provide the uplink analog RF signal to the analog local distribution interface;
convert the uplink analog RF signal into an uplink analog communications signal adapted for communications to the analog signal source; and
provide the uplink analog communications signal to the analog communications interface.

12. The DAIM of claim 1, wherein the remote DAS component in the remote DAS in the wide-area DAS is a remote head-end unit (HEU).

13. An optical fiber-based wide-area distributed antenna system (DAS), comprising:
a main DAS comprising a main head-end unit (HEU), wherein the main HEU comprises one or more digital-analog interface modules (DAIMs);
wherein each of the one or more DAIMs is coupled to a respective optical fiber-based downlink digital communications medium via a respective electrical-to-optical (E/O) converter and is coupled to a respective optical fiber-based uplink digital communications medium via a respective optical-to-electrical (O/E) converter; and
one or more remote DASs comprising one or more remote HEUs, respectively, wherein a remote HEU among the one or more remote HEUs comprises:
one or more remote-HEU digital interface modules (DIMs) corresponding to one or more radio frequency (RF) bands, respectively, wherein at least one remote-HEU DIM among the one or more remote-HEU DIMs comprised in the remote HEU is configured to interface with a respective DAIM in the main HEU;
wherein the at least one remote-HEU DIM configured to interface with the respective DAIM in the main HEU is coupled to the respective optical fiber-based downlink digital communications medium via a respective remote-HEU O/E converter and is coupled to the respective optical fiber-based uplink digital communications medium via a respective remote-HEU E/O converter;
a remote-HEU RF combiner/splitter coupled to the one or more remote-HEU DIMs;
a remote-HEU optical splitter/combiner coupled to the remote-HEU RF combiner/splitter; and
one or more remote-HEU optical interface modules (OIMs) coupled to the remote-HEU optical splitter/combiner, wherein the one or more remote-HEU OIMs is coupled with one or more remote-DAS remote antenna units (RAUs),
wherein a DAIM among the one or more DAIMs in the main HEU comprises:
an analog communications interface to be coupled with an analog signal source associated with the main HEU;
a digital bus interface, comprising:
an upstream digital bus interface coupled to a second downstream digital bus interface comprised in a second DAIM among the one or more DAIMs, wherein the second DAIM is logically configured as an upstream DAIM to the DAIM; and
a downstream digital bus interface coupled to a third upstream digital bus interface comprised in a third DAIM among the one or more DAIMs, wherein the third DAIM is logically configured as a downstream DAIM to the DAIM;
at least one digital remote distribution interface coupled to a respective downlink communications medium and a respective uplink communications medium;
an analog local distribution interface to be coupled with an RAU associated with the main HEU;
a digital communications interface to be coupled with a digital signal source associated with the main HEU;
an RF conditioning circuit coupled to the analog communications interface and the analog local distribution interface;
an analog-to-digital (A/D) converter coupled to the RF conditioning circuit;
a digital-to-analog (D/A) converter coupled to the RF conditioning circuit;
a digital signal processing circuit coupled to the A/D converter, the D/A converter, the upstream digital bus interface, the downstream digital bus interface, the at least one digital remote distribution interface, and the digital communications interface; and
a digital signal processing controller communicatively coupled to the digital signal processing circuit;
wherein the digital signal processing circuit is configured to generate a combined downlink digital RF signal and provide the combined downlink digital RF signal to the at least one digital remote distribution interface.

14. The optical fiber-based wide-area DAS of claim 13, wherein the analog signal source is configured to be a base transceiver station (BTS) and the digital signal source is configured to be a baseband unit (BBU).

15. The optical fiber-based wide-area DAS of claim 13, wherein a remote-HEU DIM among the one or more remote-HEU DIMs comprised in the remote HEU among the one or more remote HEUs comprises:
a remote-DIM upstream digital bus interface;
a remote-DIM downstream digital bus interface;
at least one remote-DIM digital remote distribution interface;

wherein the at least one remote-DIM digital remote distribution interface is coupled to the respective remote-HEU E/O converter and the respective remote-HEU O/E converter if the remote-HEU DIM is the at least one remote-HEU DIM configured to interface with the respective DAIM in the main HEU;
a remote-DIM analog local distribution interface coupled to the remote-HEU RF combiner/splitter;
a remote-DIM digital communications interface to be coupled with a remote-DAS digital signal source associated with the remote HEU;
a remote-DIM analog-to-digital (A/D) converter coupled to the remote-DIM analog local distribution interface;
a remote-DIM digital-to-analog (D/A) converter coupled to the remote-DIM analog local distribution interface;
a remote-DIM digital signal processing circuit coupled to the remote-DIM A/D converter, the remote-DIM D/A converter, the remote-DIM upstream digital bus interface, the remote-DIM downstream digital bus interface, the at least one remote-DIM digital remote distribution interface, and the remote-DIM digital communications interface; and
a remote-DIM digital signal processing controller communicatively coupled to the remote-DIM digital signal processing circuit.

16. The optical fiber-based wide-area DAS of claim 15, wherein the remote-DIM digital signal processing circuit in the remote-HEU DIM is configured to:
if the remote-HEU DIM is the at least one remote-HEU DIM configured to interface with the respective DAIM in the main HEU:
receive a combined downlink digital RF signal from the respective DAIM in the main HEU through the at least one remote-DIM digital remote distribution interface;
convert the combined downlink digital RF signal into one or more first remote-DIM downlink digital RF signals corresponding to the one or more RF bands, respectively;
provide the one or more first remote-DIM downlink digital RF signals to the remote-DIM upstream digital bus interface; and
provide the one or more first remote-DIM downlink digital RF signals to the remote-DIM downstream digital bus interface.

17. The optical fiber-based wide-area DAS of claim 16, wherein the remote-DIM digital signal processing circuit in the remote-HEU DIM is further configured to:
receive one or more second remote-DIM downlink digital RF signals from the remote-DIM upstream digital bus interface, wherein the one or more second remote-DIM downlink digital RF signals correspond to the one or more RF bands;
provide the one or more second remote-DIM downlink digital RF signals to the remote-DIM downstream digital bus interface;
receive one or more third remote-DIM downlink digital RF signals from the remote-DIM downstream digital bus interface, wherein the one or more third remote-DIM downlink digital RF signals correspond to the one or more RF bands; and
provide the one or more third remote-DIM downlink digital RF signals to the remote-DIM upstream digital bus interface.

18. The optical fiber-based wide-area DAS of claim 17, wherein the remote-DIM digital signal processing circuit in the remote-HEU DIM is further configured to:

receive a remote-DAS downlink digital baseband signal from the remote-DIM digital communications interface;
convert the remote-DAS downlink digital baseband signal to generate one or more fourth remote-DIM downlink digital RF signals corresponding to the one or more RF bands, respectively;
provide the one or more fourth remote-DIM downlink digital RF signals to the remote-DIM downstream digital bus interface; and
provide the one or more fourth remote-DIM downlink digital RF signals to the remote-DIM upstream digital bus interface.

19. The optical fiber-based wide-area DAS of claim 18, wherein the remote-DIM digital signal processing circuit in the remote-HEU DIM is further configured to:
combine one or more remote-DIM downlink digital RF signals to generate a remote-DIM combined downlink digital RF signal corresponding to an RF band associated with the remote-HEU DIM among the one or more RF bands supported by the remote HEU, wherein the one or more remote-DIM downlink digital RF signals are programmably determined by the remote-DIM digital signal processing controller from the one or more first remote-DIM downlink digital RF signals, the one or more second remote-DIM downlink digital RF signals, the one or more third remote-DIM downlink digital RF signals, and the one or more fourth remote-DIM downlink digital RF signals based on the RF band associated with the remote-HEU DIM; and
provide the remote-DIM combined downlink digital RF signal to the remote-DIM D/A converter.

20. The optical fiber-based wide-area DAS of claim 15, wherein the one or more remote-HEU OIMs comprised in the remote HEU among the one or more remote HEUs are configured to:
receive one or more remote-OIM uplink optical RF signals from the one or more remote-DAS RAUs;
convert the one or more remote-OIM uplink optical RF signals into one or more remote-OIM uplink analog RF signals; and
provide the one or more remote-OIM uplink analog RF signals to the remote-HEU optical splitter/combiner.

21. The optical fiber-based wide-area DAS of claim 20, wherein the remote-HEU optical splitter/combiner comprised in the remote HEU among the one or more remote HEUs is configured to:
receive the one or more remote-OIM uplink analog RF signals from the one or more remote-HEU OIMs comprised in the remote HEU;
combine the one or more remote-OIM uplink analog RF signals to generate a remote-HEU combined uplink analog RF signal; and
provide the remote-HEU combined uplink analog RF signal to the remote-HEU RF combiner/splitter in the remote HEU.

22. The optical fiber-based wide-area DAS of claim 21, wherein the remote-HEU RF combiner/splitter comprised in the remote HEU among the one or more remote HEUs is configured to:
receive the remote-HEU combined uplink analog RF signal from the remote-HEU optical splitter/combiner;
split the remote-HEU combined uplink analog RF signal into one or more remote-DIM combined uplink analog RF signals corresponding to the one or more RF bands, respectively; and provide the one or more remote-DIM combined uplink analog RF signals to the one or more remote-HEU DIMs comprised in the remote HEU based on the one or more RF bands, respectively.

23. The optical fiber-based wide-area DAS of claim 22, wherein the remote-DIM A/D converter in the remote-HEU DIM is configured to:
    receive a remote-DIM combined uplink analog RF signal from the remote-DIM analog local distribution interface;
    convert the remote-DIM combined uplink analog RF signal into a remote-DIM combined uplink digital RF signal; and
    provide the remote-DIM combined uplink digital RF signal to the remote-DIM digital signal processing circuit.

24. The optical fiber-based wide-area DAS of claim 13, wherein a DAIM among the one or more DAIMs comprised in the main HEU comprises a plurality of digital remote distribution interfaces.

25. The optical fiber-based wide-area DAS of claim 24, wherein:
    the plurality of digital remote distribution interfaces comprised in the DAIM is coupled to a main-HEU wavelength-division multiplexer (WDM); and
    the main-HEU WDM is coupled to a respective optical fiber-based downlink digital communications medium and a respective optical fiber-based uplink digital communications medium.

26. The optical fiber-based wide-area DAS of claim 24, wherein the plurality of digital remote distribution interfaces comprised in the DAIM is coupled to a plurality of respective optical fiber-based downlink digital communications mediums and a plurality of respective optical fiber-based uplink digital communications mediums, respectively.

27. The optical fiber-based wide-area DAS of claim 26, wherein a remote-HEU DIM comprised in the remote HEU in the one or more remote DASs comprises a plurality of remote-DIM digital remote distribution interfaces, wherein the plurality of remote-DIM digital remote distribution interfaces in the remote-HEU DIM is coupled to:
    the plurality of respective optical fiber-based downlink digital communications mediums that are coupled to the respective DAIM in the main HEU; and
    the plurality of respective optical fiber-based uplink digital communications mediums that are coupled to the respective DAIM in the main HEU.

* * * * *

UNITED STATES PATENT AND TRADEMARK OFFICE
CERTIFICATE OF CORRECTION

PATENT NO. : 10,187,151 B2
APPLICATION NO. : 15/472909
DATED : January 22, 2019
INVENTOR(S) : Dror Harel et al.

It is certified that error appears in the above-identified patent and that said Letters Patent is hereby corrected as shown below:

In the Claims

In Column 27, Line 22, Claim 1, delete "converters" and insert -- converter --, therefor.

In Column 29, Line 51, Claim 13, delete "(0/E)" and insert -- (O/E) --, therefor.

Signed and Sealed this
Tenth Day of December, 2024

Katherine Kelly Vidal
*Director of the United States Patent and Trademark Office*